(12) United States Patent
Fong et al.

(10) Patent No.: US 8,804,586 B2
(45) Date of Patent: Aug. 12, 2014

(54) CONTROL CHANNEL INTERFERENCE MANAGEMENT AND EXTENDED PDCCH FOR HETEROGENEOUS NETWORK

(75) Inventors: Mo-Han Fong, Kanata (CA); Youn Hyoung Heo, Kitchener (CA); Hua Xu, Kanata (CA); Jack Anthony Smith, Irving, TX (US); Andrew Mark Earnshaw, Kanata (CA); Robert Novak, Kanata (CA); Zhijun Cai, Irving, TX (US); Sean McBeath, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 519 days.

(21) Appl. No.: 12/685,649

(22) Filed: Jan. 11, 2010

(65) Prior Publication Data

US 2011/0170496 A1    Jul. 14, 2011

(51) Int. Cl.
*G08C 17/00* (2006.01)
*H04W 4/00* (2009.01)

(52) U.S. Cl.
USPC .......................................... 370/311; 370/329

(58) Field of Classification Search
CPC . H04W 52/02; H04W 52/0203; H04W 84/12; H04W 52/46; H04W 84/18; H04B 7/18543
USPC ................................................ 370/310–350
See application file for complete search history.

(56) References Cited

U.S. PATENT DOCUMENTS 5,457,079 A * 10/1995 Itabashi et al. ................ 502/331
8,433,251 B2 * 4/2013 Chen et al. ...................... 455/68
2003/0147454 A1    8/2003 Kwon et al.
2004/0063468 A1    4/2004 Frank
2004/0116143 A1    6/2004 Love et al.
2007/0202867 A1    8/2007 Waltho et al.
2008/0205348 A1    8/2008 Malladi
2008/0268878 A1   10/2008 Wang et al.
2009/0131065 A1 *  5/2009 Khandekar et al. ........ 455/452.1

(Continued)

FOREIGN PATENT DOCUMENTS

| | | |
|---|---|---|
| CN | 1703919 A | 11/2005 |
| CN | 101385267 A | 3/2009 |
| CN | 101404526 A | 4/2009 |
| WO | 2008118064 A2 | 10/2008 |

OTHER PUBLICATIONS

3GPP TS 36.213 V9.0.0; 3rd Generation Partnership Project; Technical Specification Group Radio Access Network; Evolved Universal Terrestrial Radio Access (E-UTRA); Physical Layer Procedures; Release 9; Dec. 2009; 79 pgs.

(Continued)

*Primary Examiner* — Warner Wong
(74) *Attorney, Agent, or Firm* — Conley Rose, P.C.; Maria L. Sekul; J. Robert Brown, Jr.

(57) ABSTRACT

A method for managing control channel interference is provided. The method includes a first access node performing at least one of blanking and transmitting at lower than nominal transmit power on at least a portion of a control channel. The method further includes the first access node applying at least one of blanking and transmitting at lower than nominal transmit power only on the control region of chosen subframes, wherein a second access node transmits the control region of the chosen subframes at nominal transmit power.

14 Claims, 15 Drawing Sheets

(56) References Cited

U.S. PATENT DOCUMENTS

| | | | |
|---|---|---|---|
| 2009/0170437 | A1 | 7/2009 | Bhattad et al. |
| 2009/0197630 | A1 | 8/2009 | Ahn et al. |
| 2009/0245194 | A1 | 10/2009 | Damnjanovic et al. |
| 2009/0252075 | A1 | 10/2009 | Ji et al. |
| 2009/0252077 | A1 | 10/2009 | Khandekar et al. |
| 2009/0257388 | A1* | 10/2009 | Khandekar et al. ........... 370/329 |
| 2009/0290597 | A1 | 11/2009 | Baumgartner et al. |
| 2009/0325626 | A1 | 12/2009 | Palanki et al. |
| 2011/0003591 | A1* | 1/2011 | Venkatachalam et al. .... 455/434 |
| 2011/0039561 | A1* | 2/2011 | Narasimha et al. ........... 455/436 |
| 2011/0051684 | A1* | 3/2011 | Li et al. ......................... 370/331 |
| 2011/0096734 | A1* | 4/2011 | Damnjanovic et al. ....... 370/329 |
| 2011/0151790 | A1* | 6/2011 | Khandekar et al. .......... 455/63.1 |
| 2011/0274072 | A1* | 11/2011 | Michel et al. ................. 370/329 |

OTHER PUBLICATIONS

3GPP TS 36.331 V8.7.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2009; 208 pgs.

3GPP TR 36.814 V1.5.0; 3rd Generation Partnership Project; Technical Specification Group Radio Access Network; Further Advancements for E-UTRA Physical Layer Aspects; Release 9; Nov. 2009; 53 pgs.

3GPP TSG-RAN1 #56 R1-090759; Control Channel Design for the Support of Wider Bandwidth for LTE-Advanced; Agenda item: 12.2; Discussion and Decision; Nortel Networks; Athens, Greece; Feb. 9-13, 2009; 10 pages.

3GPP TSG RAN WG1 #56; Agenda Item 12.1; Discussion and Decision; Multicarrier Control for LTE-Advanced; Qualcomm Europe; R1-090862; Athens, Greece; Feb. 9-13, 2009; 6 pages.

3GPP TSG-RAN WG1 Meeting #58bis; Agenda Item 7.2.1; Discussion and Decision; Extension Carrier and PDCCH-less Operation; Panasonic; R1-093939; Miyazaki, Japan; Oct. 12-16, 2009; 6 pages.

3GPP TSG RAN1 #58bis; Agenda Item 7.7; Discussion; Reliable Downlink Control for Heterogeneous Networks; Motorola; R1-093971; Miyazaki, Japan; Oct. 12-16, 2009; 7 pages.

3GPP TSG RAN WG1 Meeting #58bis; Agenda Item 15.4; Discussion; Extension Carrier Operation; Motorola; R1-093973; Miyazaki, Japan; Oct. 12-16, 2009; 2 pages.

3GPP TSG RAN WG1 #59; Agenda Item 7.2.2.1; Discussion and Decision; PDCCH Extension to Support Operation with CI; Samsung; R1-094569; Jeju, Korea; Nov. 9-13, 2009; 2 pages.

PCT International Search Report; PCT Application No. PCT/US2011/020506; mailed May 17, 2011; 4 pgs.

PCT Written Opinion of the International Searching Authority; PCT Application No. PCT/US2011/020506; mailed May 17, 2011; 7 pgs.

PCT International Search Report; PCT Application No. PCT/US2011/020508; mailed by Mar. 14, 2011; 2 pgs.

PCT Written Opinion of the International Searching Authority; PCT Application No. PCT/US2011/020508; mailed Mar. 14, 2011; 7 pgs.

PCT International Search Report; PCT Application No. PCT/US2011/020509; mailed Mar. 14, 2011; 2 pgs.

PCT Written Opinion of the International Searching Authority; PCT Application No. PCT/US2011/020509; mailed Mar. 14, 2011; 6 pgs.

PCT International Search Report; PCT Application No. PCT/US2011/020512; mailed Mar. 14, 2011; 2 pgs.

PCT Written Opinion of the International Searching Authority; PCT Application No. PCT/US2011/020512; mailed Mar. 14, 2011; 6 pgs.

Canadian Office Action; Application No. 2,786,274; Sep. 24, 2013; 2 pages.

PCT International Preliminary Report on Patentability; Application No. PCT/US2011/020508; Dec. 22, 2011; 11 pages.

Canadian Office Action; Application No. 2,786,801; Mar. 20, 2014; 2 pages.

Chinese Office Action in Co-pending Application No. 201180013444.3 on Feb. 8, 2014; 7 pages (No English translation available).

Canadian Office Action; Application No. 2,786,804; Feb. 27, 2014; 2 pages.

Chinese Office Action in Co-pending Application No. 201180013400.0 on Jan. 30, 2014; 10 pages. (No English translation available).

Canadian Office Action; Application No. 2,786,798; May 12, 2014; 3 pages.

* cited by examiner

CONTROL CHANNEL INTERFERENCE MANAGEMENT AND EXTENDED PDCCH FOR HETEROGENEOUS NETWORK

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the terms "eNB" or "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software. The term "legacy" may be used herein to refer to hardware, software, and standards related to LTE versions prior to LTE-A Release 10.

A traditional high power access node can create a relatively large area of coverage that can be referred to as a macro cell. Several different types of low power access nodes have been introduced that have a smaller area of coverage than a macro cell and that might improve the quality and reliability of the coverage provided by a macro cell. These low power access nodes include remote radio heads, pico eNBs, home eNBs (HeNBs), relay nodes, and similar components. These terms might be used interchangeably herein, or any such access node might be referred to generically as a low power node. An access node that creates a macro cell might be referred to herein as a macro eNB. The area of coverage created by a low power node might be referred to as a micro cell, a pico cell, a femto cell, a hotzone cell, a relay cell, a low power cell, or a similar term, any of which might be used interchangeably herein. Also, when a reference is made herein to an action being taken by a macro cell or by a low power cell, it should be understood that the action might be taken by the access node associated with that cell.

One difference between low power nodes and macro eNBs is a different propagation environment. In particular, low power nodes might be deployed indoors and might have different antenna heights and antenna patterns compared with macro eNBs. Also, the transmit power might be different for macro eNBs and low power nodes. For example, the maximum allowable transmit powers of a macro eNB, a remote radio head/pico, a HeNB, an outdoor relay, and an indoor relay are typically 46 dBm, 30 dBm, 20 dBm, 30 to 37 dBm, and 20 dBm, respectively, for a 10 MHz carrier bandwidth.

Heterogeneous networks are one of the important features in LTE-A. Heterogeneous networks consist of deployments where low power nodes are placed throughout a macro cell layout. As described below, a UE in a heterogeneous network might obtain higher quality, more reliable, or less costly service by attaching to a low power node rather than a macro eNB.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For both LTE Release 8 (Rel-8) and LTE-A on a backward compatible carrier, the control region consists of the physical control format indicator channel (PCFICH), the physical downlink control channel (PDCCH), and the physical HARQ (hybrid automatic repeat request) indicator channel (PHICH). The PCFICH contains the Control Format Indicator (CFI) which carries information about the number of orthogonal frequency division multiplexing (OFDM) symbols (1, 2 or 3 for bandwidths greater than 1.4 MHz) used for the transmission of PDCCHs in the corresponding subframe. The PCFICH is transmitted on four resource element (RE) groups (REGs) where each REG consists of four contiguous REs. A resource element is the most basic unit of transmission that can carry a modulation symbol and is essentially one subcarrier in the frequency domain for the duration of one OFDM symbol. These four REGs are spread over the whole system bandwidth in the first OFDM symbol of corresponding subframe.

Figure 1:
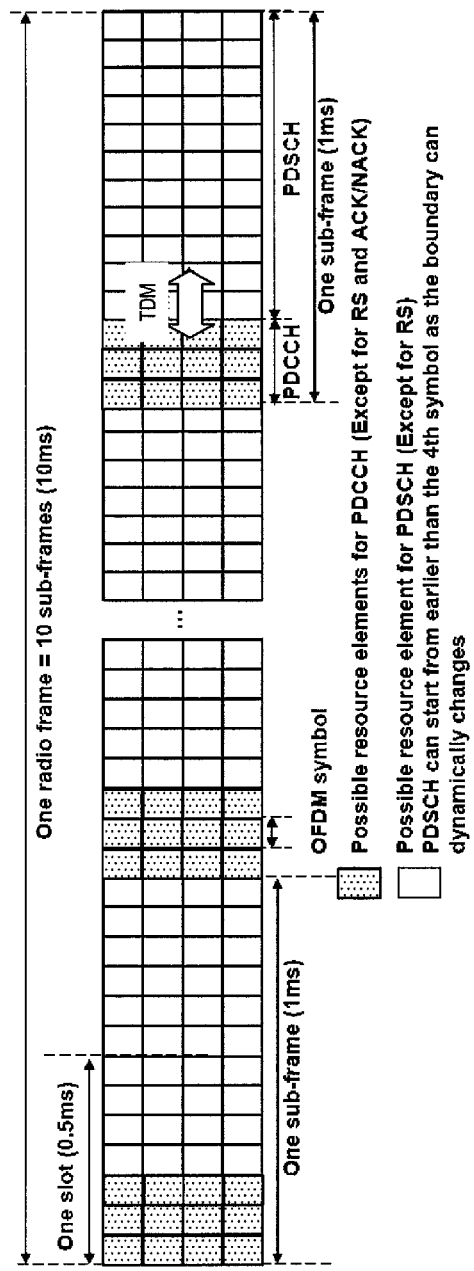
FIG. 1 is a diagram showing a PDCCH (Physical Downlink Control Channel) region and a PDSCH (Physical Downlink Shared Channel) region in portions of subframes, according to the prior art.

The PDCCH is transmitted by the serving eNB to its UE to convey physical downlink shared channel (PDSCH) and physical uplink shared channel (PUSCH) scheduling grant information. The downlink PDSCH scheduling grant can be designated to a particular UE for dedicated PDSCH resource allocation to carry UE-specific traffic, or it can be designated to all UEs in the cell for common PDSCH resource allocation to carry broadcast control information such as system information or paging. In a normal subframe, for system bandwidth other than 1.5 MHz, up to three OFDM symbols can be used as the PDCCH region (as shown in FIG. 1). In a multicast/broadcast single frequency network (MBSFN) subframe, up to two OFDM symbols can be used as the PDCCH region. Each PDCCH consists of one, two, four or eight Control Channel Elements (CCE) where each CCE consists of nine REGs. The REGs are interleaved across the system bandwidth as well as across the OFDM symbols defined for the PDCCH region. A cyclic shift is applied to the interleaved REGs based on the cell ID of each cell.

The PHICH carries downlink HARQ acknowledgement/ negative acknowledgement (ACK/NACK) information in response to an uplink PUSCH transmission. The PHICH occupies REGs within the PDCCH region. The number of OFDM symbols occupied by the PHICH is defined by the PHICH duration signaled in the Master Information Block (MIB) where the MIB is carried in the Physical Broadcast Channel (PBCH). The PHICH duration can be less than the number of OFDM symbols defined for the PDCCH region indicated by the CFI. The REGs occupied by the PHICH are also spread across the system bandwidth and the number of OFDM symbols corresponding to the PHICH duration.

As described above, REs that form a control channel (PCFICH, PDCCH, PHICH) are spread across the system bandwidth, and for the cases of the PDCCH and the PHICH, those REs are also spread across the OFDM symbols defined for the corresponding control channels. Therefore, the frequency division multiplexing type of inter-cell interference avoidance, i.e., reserving different REs or resource blocks (RBs) for control channel transmission in different cells, is not possible. A resource block represents a set of REs and has dimensions of 12 contiguous subcarriers in the frequency dimension by 1 slot in the time dimension. There are two slots in each 1 ms subframe.

There are several issues or challenges that are associated with heterogeneous deployments. As described above, low power nodes have a significantly lower transmit power than macro eNBs, i.e., 9-16 dB lower power for the case of outdoor low power nodes and 26 dB lower power for the case of indoor low power nodes. In the downlink, a UE served by a low power cell will be severely interfered with by the overlaid macro cell. Interference management or avoidance can be performed on the PDSCH region since different RBs can be reserved and/or the power can be controlled for use by the macro cell and the low power cell to their own UEs. However, similar interference management or avoidance cannot be performed for the control channels due to the REs that are used to transmit a control channel (i.e., PCFICH, PDCCH, PHICH) being spread across the system bandwidth as described above. In addition, robust reception of the PDCCH (and thus the PCFICH) is more crucial than for the PDSCH for three reasons. First, a UE needs to receive the PDCCH correctly in order to know the PDSCH resource assigned and subsequently perform PDSCH decoding. Second, a UE needs to decode the PCFICH correctly so that it can decode the PDCCH correctly and also know the PDCCH region boundary and therefore know the starting symbol of PDSCH. Third, as opposed to the PDSCH, HARQ retransmission cannot be applied to the PDCCH.

Another challenge associated with heterogeneous deployments is that in a typical homogeneous network, a UE is attached (or served) by the strongest cell, i.e., the cell with the strongest downlink received signal strength. Due to the significantly lower transmit power of the low power nodes, low power cells will have a very small service area if the same rule is applied to decide whether a UE should attach to a macro cell or a low power cell.

There are various reasons for a UE to attach to a low power cell even though the low power cell does not provide the strongest downlink received signal strength. First, when a UE has a lower coupling loss (including large scale path loss, shadowing, antenna gain, etc.) to a low power cell compared to a macro cell, it may be better for the UE to attach to the low power cell, although the UE receives a stronger downlink signal from the macro cell due to the significantly larger transmit power of the macro cell. This minimizes the required uplink transmit power from the UE and the resultant uplink interference the UE causes to other UEs in the neighbor cells.

Another reason for a UE to attach to a low power cell is that, with such low transmit power, low power cells typically have very small coverage areas. Therefore, low power nodes distributed in various locations within a macro cell coverage area represent a cell-splitting type of frequency reuse among non-collocated low power cells. Overall, a resource occupied by a UE that is served by a low power cell is much less costly to the macro cell than would be the same resource occupied by a UE that is served by a macro cell. Therefore, it may be desirable to increase the service area and the number of UEs served by a low power cell.

Another reason for a UE to attach to a low power cell is that a low power node may be a HeNB cell (also called a femto cell). A UE that is subscribed to a Closed Subscriber Group (CSG) to which the HeNB belongs may get special or cheaper services when it is served by the HeNB. When a UE is attached to a low power cell for the above reasons, the interference experienced by the UE from the overlaid macro cell might be very high.

In another scenario, a UE attached to a macro cell can experience severe interference from the low power cell. This can occur when the lower power cell is a femto cell in closed access mode where the UE is not a subscriber of the corresponding CSG. In this case, even though the downlink received signal strength from the femto cell is the strongest, the UE is not allowed to attach to the femto cell.

Figure 2:
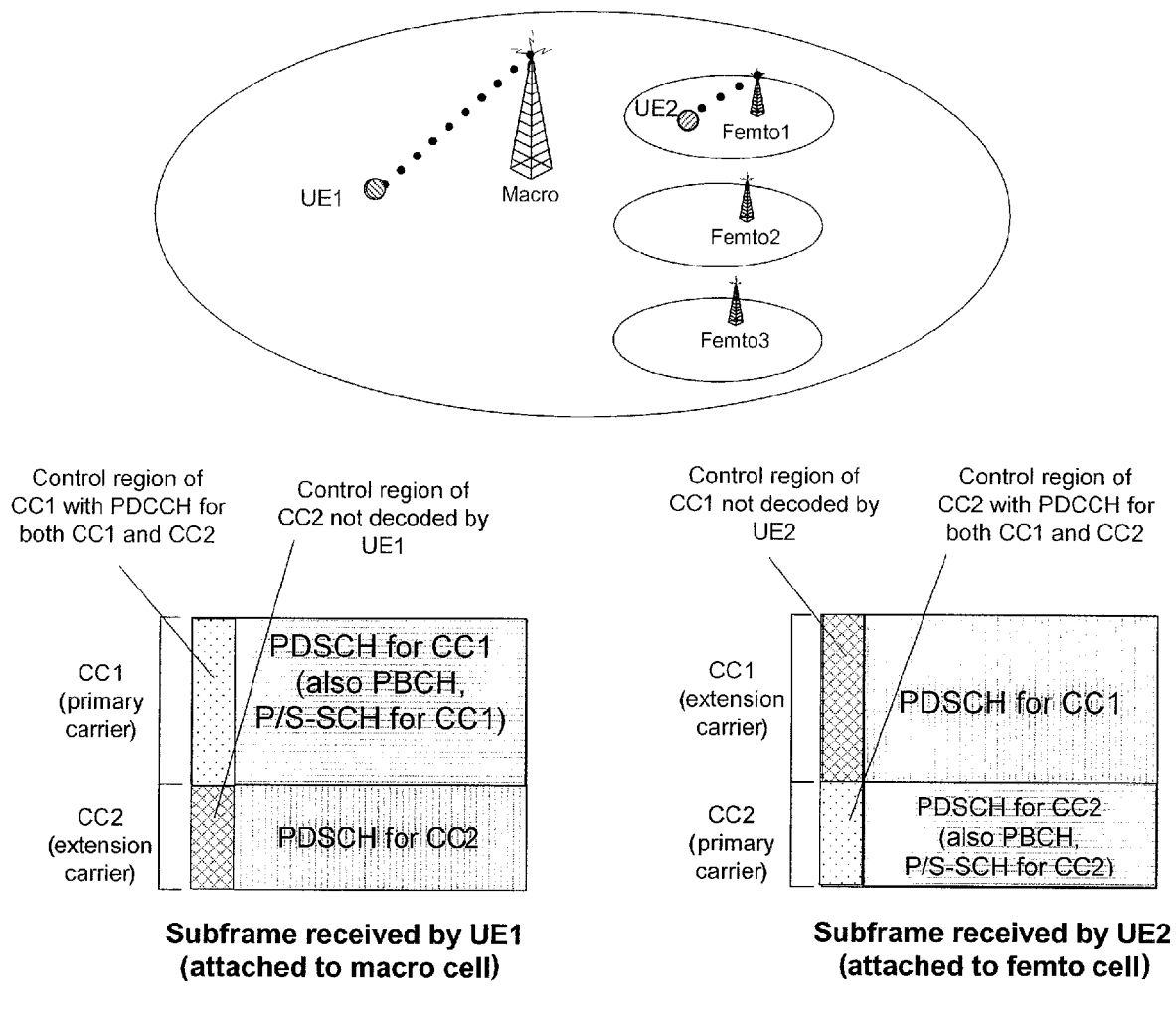
FIG. 2 illustrates blanking/muting of a control region for a heterogeneous deployment, according to the prior art.

A number of solutions have been proposed to address the PDCCH interference issues in heterogeneous networks. One proposed solution is a carrier aggregation based solution, where an extension carrier is defined with blanking/muting of the PDCCH region. This solution is shown in FIG. 2. Interference on femto cell control region transmissions (PDCCH, PCFICH, PHICH) can be mitigated by configuring extension carriers with cross-carrier scheduling. An extension carrier is a carrier that does not transmit the control region. As shown in FIG. 2, for UEs attached to the macro cell (e.g. UE1), available bandwidth can be split into two component carriers (CCs), CC1 and CC2, with CC1 configured as the primary carrier containing all the critical control signaling and with CC2 configured as an extension carrier. CC1 can be accessible to both legacy (LTE Release 8) and advanced (LTE Release 10) UEs. Legacy LTE UEs will be unaware of the existence of the extension carrier. Advanced LTE-A UEs can be configured to receive data on the extension carrier (in addition to the primary carrier) using cross-carrier PDSCH assignments received in the control region of the primary carrier. This allows the macro cell to "free up" the control region of CC2 from interfering with the low power cell due to the high power of the downlink PDCCH/PHICH/PCFICH transmissions. Since the CC2 control region is free from interference caused by macro eNB transmissions, various femto cells within the coverage area of the macro cell can configure their control region to overlap (in the time domain and the frequency domain) with the control region of the macro cell and configure CC2 as their primary carrier. If the bandwidth corresponding to CC1 is also available for the femto cells, they can further configure CC1 as an extension carrier and schedule CC1 PDSCH resources using cross-carrier scheduling assignments from CC2.

For the PDSCH region on CC1 and CC2, interference from the macro cell to the femto cell can be mitigated by RB-based interference management/avoidance techniques. Alternatively, the macro cell and the femto cell can each lower their PDSCH transmit power on their corresponding extension carrier, i.e., CC2 and CC1 respectively. In this way, the interference from the macro cell on the Primary/Secondary Synchronization Signal (PSS/SSS) and PBCH transmissions of femto cells can be reduced and vice versa.

This solution has two main drawbacks. First, although this solution significantly reduces the interference from the macro cell to the control region of the low power cell, a new type of carrier (i.e., extension carrier) has to be defined. Since the control region is 'blanked' or not transmitted in the extension carrier, this extension carrier cannot be used to support legacy Rel-8 UEs. Second, this solution increases the loading of the PDCCH on the primary (or non-extension carrier). Since the PDCCH region is limited to a maximum of three OFDM symbols, the PDCCH resources may not be sufficient to support all of the PDSCH assignments on multiple CCs.

Figure 3A:
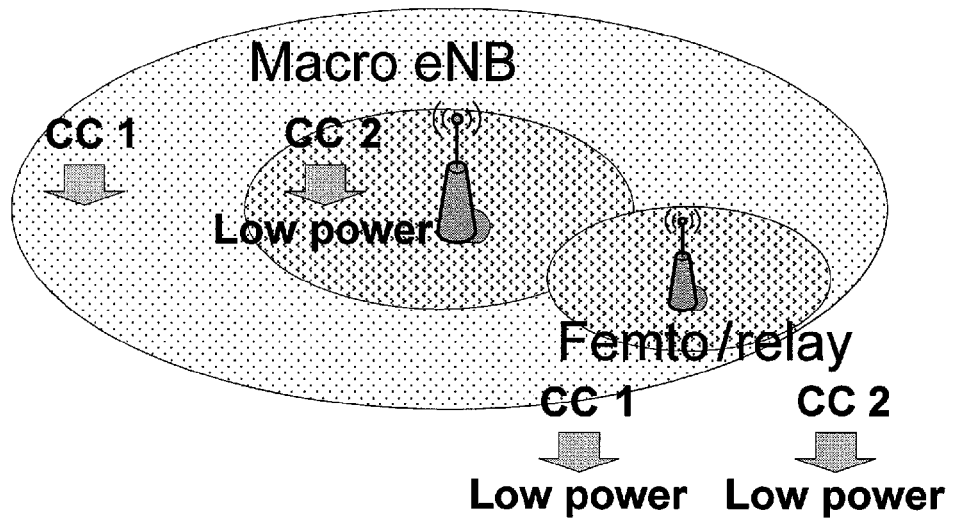
FIGS. 3a and 3b illustrate reduced transmit power on a macro cell for a heterogeneous deployment, according to the prior art.
Figure 3B:
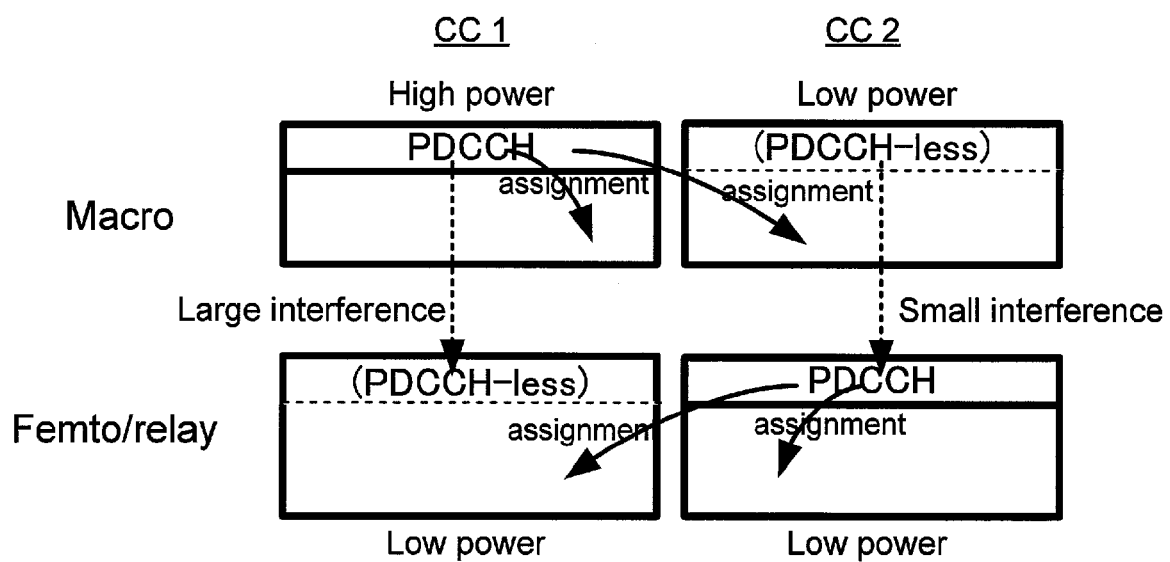

Another proposed solution to address the PDCCH interference issues in heterogeneous networks is also a carrier aggregation based solution. In this case, the transmit power of certain carriers is reduced. That is, instead of blanking of the transmission of the control region on an extension carrier (PDCCH-less carrier), it has been proposed that the macro cell reduce the transmit power on the extension carrier. This is shown in FIG. 3.

In the macro cell, a higher transmit power is used on CC1 while a lower transmit power is used on CC2. In the femto/relay cell, the transmit power is low on both CCs. Since PDCCHs on CC1 in the femto/relay cell suffer strong interference from the macro cell, a PDCCH-less operation is configured for CC1 in the femto/relay cell. Although the PDSCH resources may suffer a similar strong interference on CC1 in the femto/relay cell as the PDCCH, the PDSCH resources can be efficiently utilized by an RB-level interference coordination between the macro cell and femto/relay cell depending on the traffic load of the macro cell and the femto/relay cell. It has also been proposed that it may be useful to configure a PDCCH-less operation for CC2 in the macro cell because transmitting PDCCHs from CC1 is more efficient and reliable.

There are two main drawbacks to this solution. First, reducing the transmit power of one of the carriers on the macro cell does not help if the pico/femto cell deployment is not at the cell edge. In particular for a femto cell, the deployment can potentially be anywhere within the macro cell coverage area. Second, in the case where a pico/femto cell is deployed at the cell edge, this solution can work, but there is no reason to reduce the transmit power of the macro eNB on CC2 for the PDSCH region as well. This unnecessarily reduces the coverage and capacity of the PDSCH.

Yet another proposed solution to address the PDCCH interference issues in heterogeneous networks is also a carrier aggregation based solution. In this case, UEs in different locations are served by different carriers. More specifically, it has been proposed that the CC1 discussed above does not need to be a PDCCH-less carrier in the pico/femto cell. It can be used to serve UEs that are close to the pico/femto eNB and experience low interference from the macro cell.

This solution has drawbacks similar to those of the first and second solutions described above when blanking/muting of the PDCCH is performed on CC2 by the macro cell or when the macro cell transmit power on CC2 is reduced, respectively.

Yet another proposed solution to address the PDCCH interference issues in heterogeneous networks is a non-carrier aggregation based solution. In this case, the control region is time shifted between the macro cell and the low power cell. That is, instead of using carrier aggregation and different treatment (e.g., blanking or power management) on different CCs, it has been proposed that the subframe timing between the macro cell and the HeNB cell be shifted by k symbols. This is shown in FIG. 4 and FIG. 5.

Figure 4:
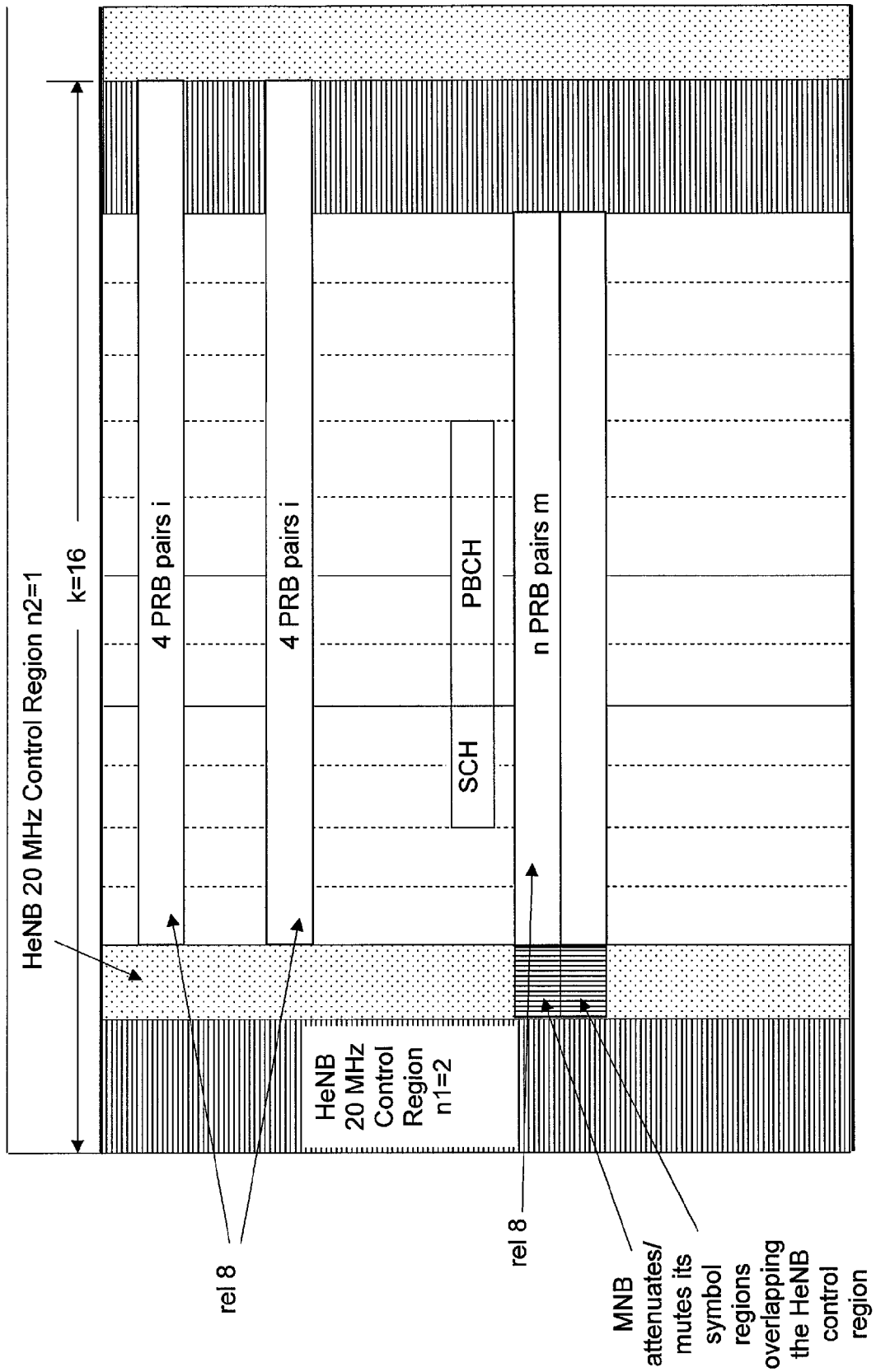
FIG. 4 illustrates a shift of a HeNB subframe relative to that of a macro cell, according to the prior art.
Figure 5:
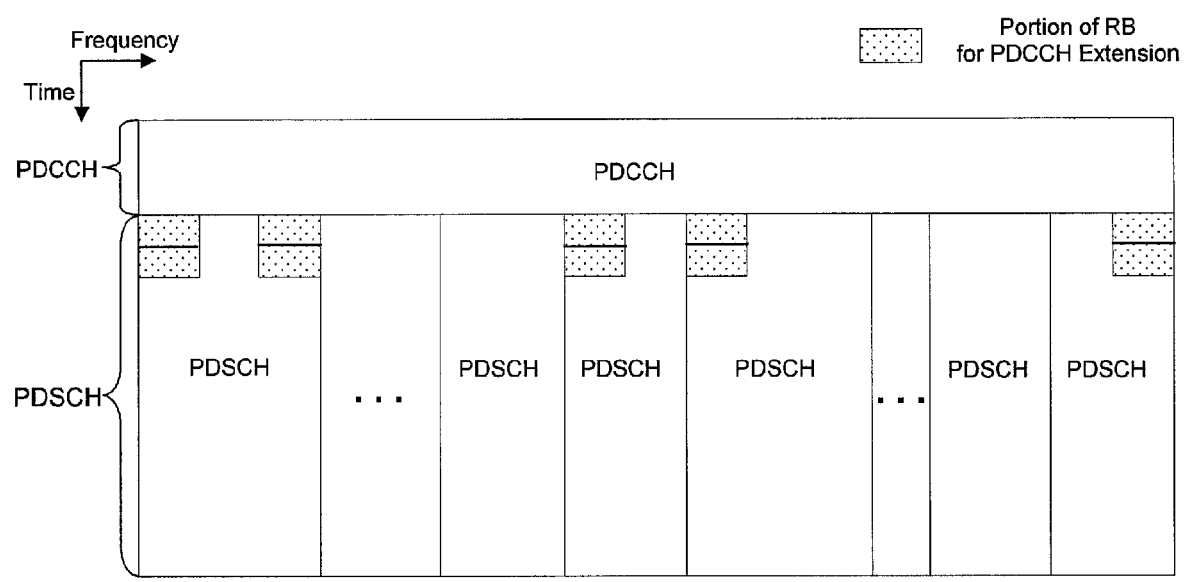
FIG. 5 illustrates extending a PDCCH transmission region in a backward compatible component carrier, according to the prior art.

As shown in FIG. 4 (where the vertical axis represents frequency and the horizontal axis represents time), the proposed solution uses time shifting of the HeNB transmission by k symbols (i.e., to avoid overlap with the macro eNB control region, n1) and uses macro eNB power reduction or muting on the portion of a symbol (or symbols) that overlap the control region of the HeNB. The macro eNB could also use power reduction on all the RBs (i.e., the 25 RBs for the case of 5 MHz system bandwidth) overlapping the HeNB control region to improve PDSCH performance for HeNBs very close to the macro eNB. It has been proposed that a single OFDM symbol HeNB control region (n2=1) is preferred for PDSCH efficiency. This leaves five CCEs for HeNB control channels, which should be sufficient for HeNB control signaling. Due to the time shift of the HeNB transmissions, the last n1 symbols of the HeNB PDSCH region would see interference from the macro eNB control region. The HeNB PDSCH overlapped with the macro cell control region could be further mitigated by either (a) using truncation so that only 14−n2−n1 symbols would be used for the HeNB PDSCH or (b) not using truncation (i.e., using 14−n2 symbols for HeNB PDSCH) but accounting for the overlap via the selection of an appropriate modulation and coding scheme.

It has also been proposed that an additional one subframe shift (k=14+n1=16 total symbols) is needed so that the HeNB's PSS/SSS/PBCH do not overlap with the macro eNB's PSS/SSS/PBCH. Then the macro cell would have to mute or attenuate its PDSCH symbol(s) overlapping the HeNB control region and would also attenuate or mute RBs that overlap the HeNB's PSS/SSS/PBCH.

This solution has three main drawbacks. First, muting or reduced power on a few symbols of the PDSCH region of the macro eNB will severely degrade the PDSCH performance, in particular for a Rel-8 UE that is unaware of the muting or reduced power. Second, truncation of the last few symbols in the PDSCH region of the HeNB will severely degrade the performance for a Rel-8 UE. Third, this solution is dependent on full timing synchronization between the HeNB and the macro eNB.

Another proposed solution to address the PDCCH interference issues in heterogeneous networks is also a non-carrier aggregation based solution. In this case, it has been proposed to define a new extended PDCCH (E-PDCCH) region in the PDSCH region. In general, several key objectives have been proposed for the E-PDCCH. First, the resources available for the PDCCH are extended, in particular for carrier aggregation as well as for other features that also increase the required resources for the PDCCH, such as multiple user multiple input/multiple output (MU-MIMO). Second, interference mitigation of the PDCCH for heterogeneous networks might be performed as the E-PDCCH is defined in the PDSCH region, and therefore RB-based interference management and coordination can be performed.

The proposals related to this solution do not provide a great deal of detail, but most of them indicate reuse of the existing PDCCH structure and the relay PDCCH (R-PDCCH) design for the backhaul link between the donor eNB and the relay node. A general structure of the E-PDCCH is shown in FIG. 5. The E-PDCCH region can be time division multiplexed (TDM) and/or frequency division multiplexed (FDM) with the existing PDSCH region, where a number of RBs (contiguous or non-contiguous) and a number of OFDM symbols within those RBs are used for the E-PDCCH.

Primary and secondary PDCCHs have been proposed, where the primary PDCCH is located in the legacy PDCCH region and consists of new downlink control information (DCI) that points to the secondary (i.e., extended) PDCCH region. The new DCI is scrambled by an LTE-A radio network temporary identifier (RNTI), i.e., an RNTI defined for all LTE-A UEs.

As mentioned above, a drawback of this solution is that not much detail has been provided on how the E-PDCCH would be used in a heterogeneous network. Also, no consideration has been given on the impact of TDM/FDM between the E-PDCCH and PDSCH regions on the reference signal design.

In an embodiment, six solutions are provided that address the PDCCH interference issues in heterogeneous networks and the drawbacks of the existing solutions for those issues.

The first solution is a carrier aggregation based solution wherein a reduced transmit power is used on the control region only of the macro cell. Three concepts under this solution address the PDCCH interference problems described above and some of the drawbacks of the existing carrier aggregation based solutions to those problems. In the first concept under the first solution, the macro eNB transmit power is reduced on the control region but the transmit power on the PDSCH region is not reduced accordingly, so the performance of the PDSCH is not impacted while the interference to the control region of low power nodes is reduced. In the second concept under the first solution, methods are provided to reduce the control region transmit power without reducing the transmit power on the Common Reference Signal (CRS). This supports a non-reduced PDSCH coverage and data rate for Rel-8 UEs. In the third concept under the first solution, methods are provided to reduce the control region transmit power and corresponding CRS transmit power. This provides uniform coverage of the PDCCH and PDSCH for Rel-8 UEs. Details of each of these concepts will now be provided.

Figure 6A:
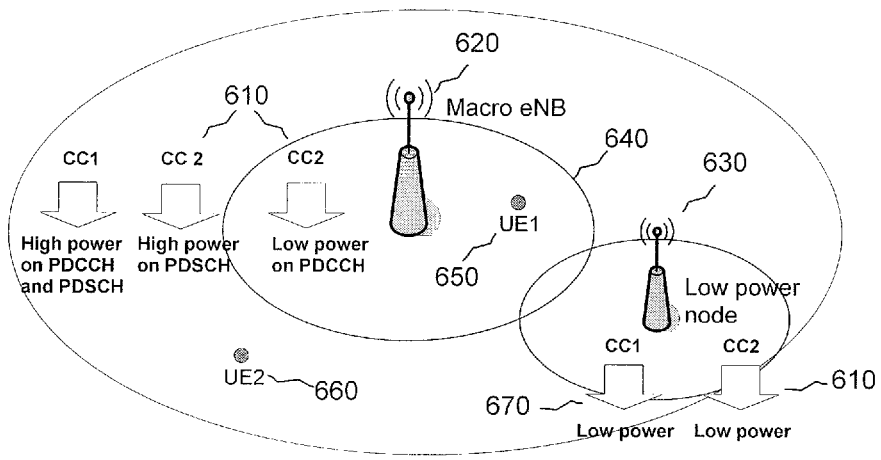
FIGS. 6a and 6b illustrate reduced transmit power on a macro cell control region for a heterogeneous deployment, according to an embodiment of the disclosure.
Figure 6B:
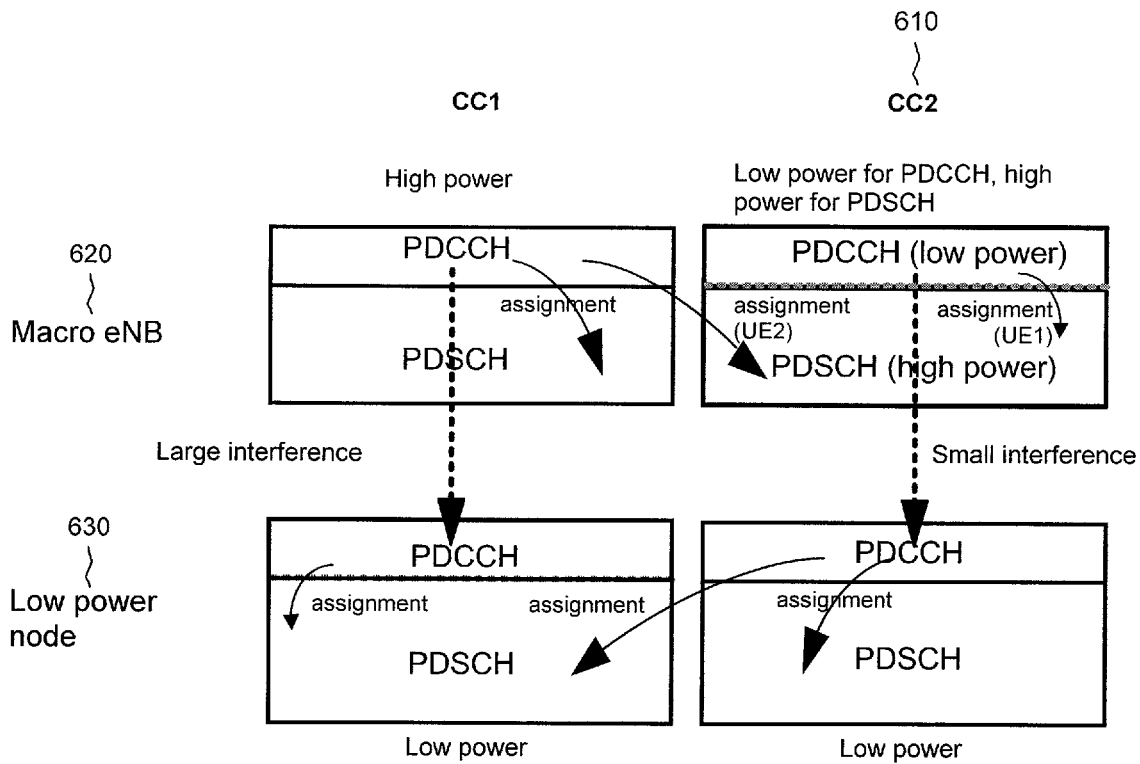

In an embodiment of the first concept under the first solution, the transmit power is reduced on the control region (i.e., PCFICH, PDCCH, PHICH) only on one or a subset of the CCs of the macro cell. The PDSCH transmit power of those CCs is not reduced accordingly; however, RB-based power management can be performed for inter-cell interference coordination with the low power nodes. This is illustrated in FIGS. 6a and 6b. On CC2 610, the macro eNB 620 reduces the transmit power on its control region such that the interference introduced to the control region of the low power node 630 is small. To effectively reduce the control region interference, the number of OFDM symbols in the control region of the low power node 630 is set equal to or less than that number for the macro eNB 620. This is practically achievable since typically the number of UEs served by a low power node is much lower than the number of UEs served by a macro eNB, and therefore the low power nodes generally require smaller PDCCH regions.

To achieve this, in one embodiment, the macro eNB transmits at the maximum possible PDCCH region size (for example, the macro eNB uses three or four OFDM symbols). In this way, there will be no or much reduced interference from the PDCCH region of the macro eNB to the PDCCH of the low power node. In another embodiment, the low power node transmits the PDCCH in a number of OFDM symbols that is less than or equal to N. N is configured by the network through signaling (e.g., the macro eNB signals to the low power node via S1 or X2 interface or a self organizing network (SON) manager signals to the low power node) and hence the macro eNB will transmit the PDCCH region with a number of OFDM symbols that is equal to or larger than N. In another embodiment, N may be pre-configured. The second alternative may be more attractive since it is configurable (based on the loading, the interference situations, etc.) and more spectrum efficient. To enable the alternative, the low power node may need to report the interference measurement, average loading, etc., to the network (e.g., to the macro eNB via S1/X2 signaling or to the SON manager) to select a suitable N.

Due to the reduced control region transmit power on CC2 610, the control channel coverage 640 of the macro cell on CC2 610 is much reduced as shown in FIG. 6a. For a Rel-8 or LTE-A UE (e.g., UE1 650 in FIG. 6a) served by the macro cell which is located close to the macro eNB 620 and within the control channel coverage 640 of CC2 610, the macro eNB 620 can transmit the PDCCH on CC2 610 to the UE 650 to schedule a PDSCH assignment on CC2 610. That is, there is no need for cross carrier scheduling assignment. For a LTE-A UE (e.g., UE2 660 in FIG. 6a) served by the macro cell which is located outside of the control channel coverage of CC2 610, the macro eNB 620 can transmit the PDCCH on CC1 670 to the UE 660 to schedule PDSCH assignment on CC2 610. That is, cross carrier scheduling assignment is used.

In this way, even though the macro cell control channel coverage on CC2 is reduced, the macro cell PDSCH coverage, data rate, and capacity for LTE-A UEs are not affected. In addition, since the macro cell control region on CC2 is not blanked/muted, CC2 can be used to serve legacy Rel-8 UEs, albeit with reduced coverage. It should be noted that Rel-8 does not support the cross carrier scheduling assignment feature. Therefore, a Rel-8 UE located outside of the CC2 control channel coverage is assigned PDSCH resources on CC1 only through a PDCCH scheduling assignment transmitted on CC1.

In the second concept under the first solution, the control region transmit power is reduced without reducing the transmit power on the CRS. CRS is a reference signal used for channel estimation and PDCCH/PDSCH demodulation by Rel-8 UEs. The CRS is also used by LTE-A UEs for channel estimation and demodulation of the PDCCH. A UE-specific demodulation RS (DM-RS) is used in LTE-A for channel estimation and demodulation of the PDSCH.

In this concept, in an embodiment, even though the control channel transmit power is reduced as in the first concept of the first solution, (e.g., on CC2 of the macro eNB), the CRS is transmitted at non-reduced nominal power. For a Rel-8 UE, the PDSCH is transmitted at a power level that is offset from the CRS transmit power, where the offset value is configured per UE and ranges from −6 dB to 3 dB. Since the transmit power of the CRS is not reduced, the transmit power of the PDSCH for Rel-8 UEs does not need to be reduced, and therefore the coverage is not impacted.

Figure 7:
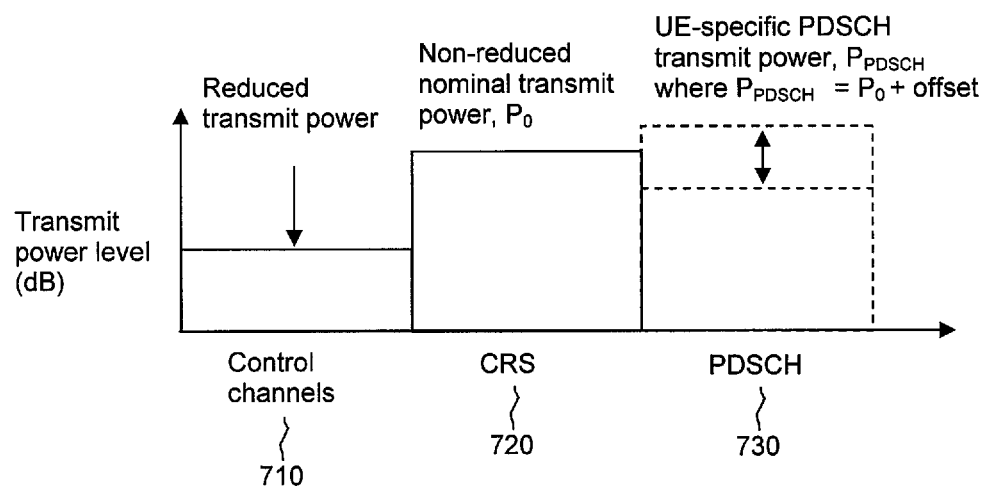
FIG. 7 illustrates the relative transmit power levels of the control channels, the CRS (Common Reference Signal), and the PDSCH, according to an embodiment of the disclosure.

This concept is illustrated in FIG. 7. The control channels 710 are transmitted at a reduced power relative to the CRS 720, which is transmitted at a non-reduced nominal transmit power, $P_0$. The PDSCH 730 is transmitted at a UE-specific transmit power that is equal to $P_0$ plus an offset.

There are several issues related to maintaining a high transmit power on the CRS while reducing the control channel transmit power. One issue is that, for the RRC_Connected mode, Rel-8 UEs and possibly LTE-A UEs might use the CRS to measure the reference signal received power/reference signal received quality (RSRP/RSRQ) to trigger measurement reports to the eNB. The UEs might be outside of the coverage of the control channels on CC2 while the measured RSRP/RSRQ from the CRS is still at an acceptable level. As a result, a measurement report may not be triggered, and the eNB may not know that the UE has moved out of the control channel coverage of CC2.

A second issue is that, for the RRC_Idle mode, Rel-8 UEs and possibly LTE-A UEs might use the CRS for measuring RSRP/RSRQ to perform cell ranking for cell reselection purposes. If the existing Rel-8 cell ranking criteria (as shown below) are used, the UE may reselect a cell (carrier) to camp on even when the UE is outside of the PDCCH coverage of the carrier. The cell-ranking criterion $R_s$ for a serving cell s and the cell-ranking criterion $R_n$ for a neighboring cell n are defined by:

$$R_s = Q_{meas,s} + Q_{hyst}$$

$$R_n = Q_{meas,n} - Q\text{offset}$$

where $Q_{meas}$ is the RSRP measurement quantity used in cell reselections, and $Q_{hyst}$ specifies the hysteresis value for ranking criteria. For intra-frequency, Qoffset equals $\text{Qoffset}_{s,n}$ if $\text{Qoffset}_{s,n}$ is valid; otherwise, Qoffset equals zero. For inter-frequency, Qoffset equals $\text{Qoffset}_{s,n}$ plus $\text{Qoffset}_{frequency}$ if $\text{Qoffset}_{s,n}$ is valid; otherwise, Qoffset equals $\text{Qoffset}_{frequency}$. $\text{Qoffset}_{s,n}$ specifies the offset between the two cells, i.e. the serving cell s and the neighboring cell n. $\text{Qoffset}_{frequency}$ is a frequency-specific offset for equal priority E-UTRAN frequencies.

For the cell selection case in the RRC_Idle mode, a Rel-8 UE and possibly a LTE-A UE follow the Rel-8 criterion for selecting the cell to camp on based on the measured RSRP value. If the UE is outside of the PDCCH coverage of a cell (carrier) but the cell selection criterion has been met due to the higher CRS transmit power, the UE will not be able to subsequently locate and decode the System Information Blocks (SIBs) and therefore will not select the cell (carrier) to camp on.

A third issue is that the high power transmission of the CRS by the macro eNB might interfere with the CRS transmitted by the low power nodes. In Rel-8, there are only three possible location shifts for the CRS in each subframe for collision avoidance of the CRS among neighbor cells if at least two CRS antenna ports are allocated for a cell. With a potential high density deployment of low power nodes, there is a high likelihood that the CRSs between the macro eNB and the low power nodes will collide. If a collision occurs, the SINR of the CRS transmitted by the low power node will be severely degraded, and thus the channel estimation performance of UEs attached to the low power node will be severely impacted.

In an embodiment, four possible remedies to address the first issue described above are provided for Rel-8 and LTE-A UEs. In a first remedy, the eNB configures one or more scaled RSRP/RSRQ thresholds for the UE to apply to the measurement results on CC2, in order to trigger measurement and measurement reports on CC2. The level of scaling corresponds to the power reduction on the control channels. In one embodiment, the eNB configures a scaled-up s-Measure value, where s-Measure, as defined in the Third Generation Partnership (3GPP) Technical Specification (TS) 36.331, is the serving cell (carrier) signal quality threshold controlling whether or not the UE is required to perform measurements of intra-frequency, inter-frequency, and inter-RAT (Radio Access Technology) neighboring cells. The UE is also configured with an intra-frequency or inter-frequency measurement object and reporting configuration corresponding to the carrier frequency of other available component carriers, such as CC1 in the example provided with respect to the first concept under the first solution. In an embodiment, the inter-frequency measurement reporting criteria for CC1 can be based on Event A5 defined in 3GPP TS 36.331. That is, measurements are reported when the serving cell (carrier) measurement result becomes worse than threshold1 and the neighbor cell (carrier) measurement result becomes better than threshold2. In this case, the eNB configures a scaled-up threshold1 value. Based on the measurement report received from the UE, the eNB can decide whether to hand over the UE from CC2 to CC1. The other inter-frequency measurement reporting criteria, such as events A4, A3, etc., can also be used.

In a second remedy, instead of relying on the UE's intra-frequency or inter-frequency measurements and measurement reports, the eNB can compare the UE's CQI (Channel Quality Indicator) report on CC2 with an appropriate threshold that takes into consideration the reduced control channel power. The eNB can use the comparison to decide whether to hand over the UE to another CC with a larger coverage, such as CC1 in the example provided with respect to the first concept under the first solution. If CC1 and CC2 are in the same frequency band, the CQI report from the UE on CC2 provides a sufficiently close estimate of the long-term signal quality on CC1. If CC1 and CC2 are in different frequency bands, the eNB can apply a predefined correction factor to the CQI reported from the UE on CC2 to estimate the long-term signal quality on CC1.

In addition, for LTE-A UEs that support carrier aggregation, further possible remedies to address the first issue can be applied. In a third remedy, an LTE-A UE is configured (or assigned) multiple CCs, such as CC1 and CC2, as shown in the example provided with respect to the first concept under the first solution. When the UE is in the control channel coverage of CC2, only CC2 is activated. That is, the UE only performs signal reception on CC2 during the active time on CC2.

In one embodiment under this third remedy, the UE is configured to perform intra-frequency measurement on CC1 and CC2. The intra-frequency measurement reporting criteria configured on CC2 are such that a measurement report is triggered when the RSRP/RSRQ on CC2 is below a certain threshold, e.g., Event A2 as defined in 3GPP TS 36.331. The intra-frequency measurement reporting criteria configured on CC1 are such that a measurement report is triggered when the RSRP/RSRQ on CC1 is above a certain threshold, e.g., Event A1 as defined in 3GPP TS 36.331. Based on these measurement reports, the eNB can decide when to activate CC1 and deactivate CC2 for the UE.

In another embodiment under this third remedy, the UE is configured to perform intra-frequency measurement on CC2, which is the serving cell (or carrier). The UE is configured with a measurement object that corresponds to the carrier frequency of CC1 to perform inter-frequency measurement on the non-serving cell (or carrier), i.e., CC1 in this example. The inter-frequency measurement reporting criteria configured for CC1 are such that a measurement report is triggered when the serving cell (i.e., CC2) RSRP/RSRQ is below a certain threshold and the inter-frequency cell (i.e., CC1) RSRP/RSRQ is above a certain threshold, e.g., Event A5 as defined in 3GPP TS 36.331. Based on these measurement reports, the eNB can decide when to activate CC1 and deactivate CC2 for the UE.

In another embodiment under this third remedy, no intra- or inter-frequency measurement object is configured for CC2. The eNB can compare the UE's CQI report on CC2 with an appropriate threshold that takes into consideration the reduced control channel power in deciding whether to hand over the UE to another CC with a larger coverage, e.g., CC1 in the example provided with respect to the first concept under the first solution. If CC1 and CC2 are in the same frequency band, the CQI report from the UE on CC2 provides a sufficiently close estimate of the long-term signal quality on CC1. If CC1 and CC2 are in different frequency bands, the eNB can apply a predefined correction factor to the CQI reported from the UE on CC2 to estimate the long-term signal quality on CC1.

In a fourth remedy, an LTE-A UE is configured (or assigned) multiple CCs, e.g., CC1 and CC2 as shown in the example provided with respect to the first concept under the first solution. When the UE is in the control channel coverage of CC2, both CC1 and CC2 are activated. That is, the UE performs signal reception on CC1 and CC2 during the active time of CC1 and CC2, respectively.

In one embodiment under this fourth remedy, the UE is configured to perform intra-frequency measurement on CC1 and CC2. The intra-frequency measurement reporting criteria configured on CC2 are such that a measurement report is triggered when the RSRP/RSRQ on CC2 is below a certain threshold, e.g., Event A2 as defined in 3GPP TS 36.331. Based on the measurement report, the eNB can decide when to deactivate CC2 for the UE.

In another embodiment under this fourth remedy, the UE is configured with a measurement object to perform intra-frequency measurement on CC2. The UE is configured with a measurement object that corresponds to the carrier frequency of CC1. The measurement reporting criteria configured for the measurement object of CC1 are such that a measurement report is triggered when a reference serving cell (e.g. CC2) RSRP/RSRQ is below a certain threshold and a neighbor cell (e.g. CC1) RSRP/RSRQ is above a certain threshold, e.g., similar to Event A5 as defined in 3GPP TS 36.331. Based on these measurement reports, the eNB can decide when to deactivate CC2 for the UE.

In another embodiment under this fourth remedy, no intra-frequency measurement object is configured for CC2. The eNB can compare the UE's CQI report on CC2 with an appropriate threshold that takes into consideration the reduced control channel power in deciding whether to deactivate CC2. If CC1 and CC2 are in the same frequency band, the CQI report from the UE on CC2 provides a sufficiently close estimate of the long-term signal quality on CC1. If CC1 and CC2 are in different frequency bands, the eNB can apply a predefined correction factor to the CQI reported from the UE on CC2 to estimate the long-term signal quality on CC1. Alternatively, the eNB configures the UE to report CQI on both CC1 and CC2.

In an embodiment, two possible remedies are provided to address the second issue described above regarding the RRC_Idle mode. A first remedy to the second issue can be applied to Rel-8 UEs as well as LTE-A UEs. The eNB broadcasts (e.g., in SIB4) an adjusted value of $\text{Qoffset}_{s,n}$ that accounts for the reduced control channel transmit power with respect to the CRS transmit power. For example, when CC2 is the serving cell s camped on by the UE, the $\text{Qoffset}_{s,n}$ value broadcast by CC2 is a negative value that accounts for the transmit power delta between the CRS and the control channel. This negative value means the $Q_{meas,n}$ of the neighbor cell n, which does not have a transmit power imbalance between the CRS and the control channel, is effectively boosted by $|\text{Qoffset}_{s,n}|$. When CC2 is a neighbor cell n being searched by the UE, i.e., the UE is camped on another serving cell s (e.g., CC1) that does not have a transmit power imbalance between the CRS and the control channel, the $\text{Qoffset}_{s,n}$ value broadcast by CC1 that corresponds to the neighbor cell n on CC2 is a positive value that accounts for the transmit power delta between the CRS and the control channel in CC2. This positive value means the neighbor cell's $Q_{meas,n}$ is effectively de-boosted by $|\text{Qoffset}_{s,n}|$. The adjusted value of $\text{Qoffset}_{s,n}$ may need to be updated when the power reduction in the serving cell and the neighboring cells is changed. When the serving cell s and neighbor cell n both correspond to carriers that have the same transmit power imbalance between the CRS and the control channel, the $\text{Qoffset}_{s,n}$ value broadcast by the serving cell does not need to account for the power delta between the CRS and the control channel. When the serving cell s and neighbor cell n both correspond to carriers that have a different transmit power imbalance between the CRS and the control channel, the $\text{Qoffset}_{s,n}$ value broadcast by the serving cell needs to account for the power delta between the CRS and the control channel.

A second remedy to the second issue applies to LTE-A UEs only, as the Rel-8 cell reselection is modified to the following:

$$R_s = Q_{meas,s} + Q_{hyst} - Q_{control\_offset,\,s}$$

$$R_n = Q_{meas,n} - \text{Qoffset} - Q_{control\_offset,\,n}$$

where $Q_{meas}$ the RSRP measurement quantity used in cell reselections. For intra-frequency, Qoffset equals $Qoffset_{s,n}$ if $Qoffset_{s,n}$ is valid; otherwise, Qoffset equals zero. For inter-frequency, Qoffset equals $Qoffset_{s,n}$ plus $Qoffset_{frequency}$ if $Qoffset_{s,n}$ is valid; otherwise, Qoffset equals $Qoffset_{frequency}$. $Q_{control\_offset, s}$ is the offset applied to $Q_{meas}$ of the serving cell to account for the reduced control channel transmit power with respect to the CRS transmit power. $Q_{control\_offset, n}$ is the offset applied to $Q_{meas}$ of a neighbor cell to account for the reduced control channel transmit power with respect to the CRS transmit power. These parameters are signaled to the UE via the broadcast control channel or possibly by the dedicated channel.

To resolve the third issue described above, the low power node can monitor the neighbor cells' interference conditions and choose the appropriate CRS shift that would result in the least interference from neighbor cells. However, with potential high density deployment of low power nodes, CRS interference from the macro cell and/or neighbor low power cells may still be inevitable.

In an alternate remedy to resolve the third issue, a third concept is provided wherein a reduced control region transmit power and corresponding CRS transmit power are used by the macro eNB. In this embodiment, the transmit powers of the control channels and the CRS are reduced by the same nominal amount. In this way, the CRS transmitted by the macro eNB does not interfere with the CRS transmitted by the low power nodes even when the locations of the CRS REs collide. Furthermore, this approach does not incur problems associated with the second concept described above for RRC_Connected mode measurement report and RRC_Idle mode cell reselection. For a Rel-8 UE, the PDSCH is transmitted at a power level that is offset from the CRS transmit power, where the offset value is configured per UE and ranges from −6 dB to 3 dB. Since the transmit power of the CRS is reduced, the transmit power of the PDSCH for Rel-8 UEs is also reduced, and therefore the data rate and coverage of the PDSCH for a Rel-8 UE is also reduced similarly to that of the control channels. For an LTE-A UE, since a UE-specific DM-RS is used for PDSCH demodulation, the transmit power of the PDSCH is not tied to that of the CRS. The PDSCH for an LTE-A UE can be transmitted at non-reduced power or at a power suitable for PDSCH interference coordination between the macro cell and low power cells.

Figure 8:
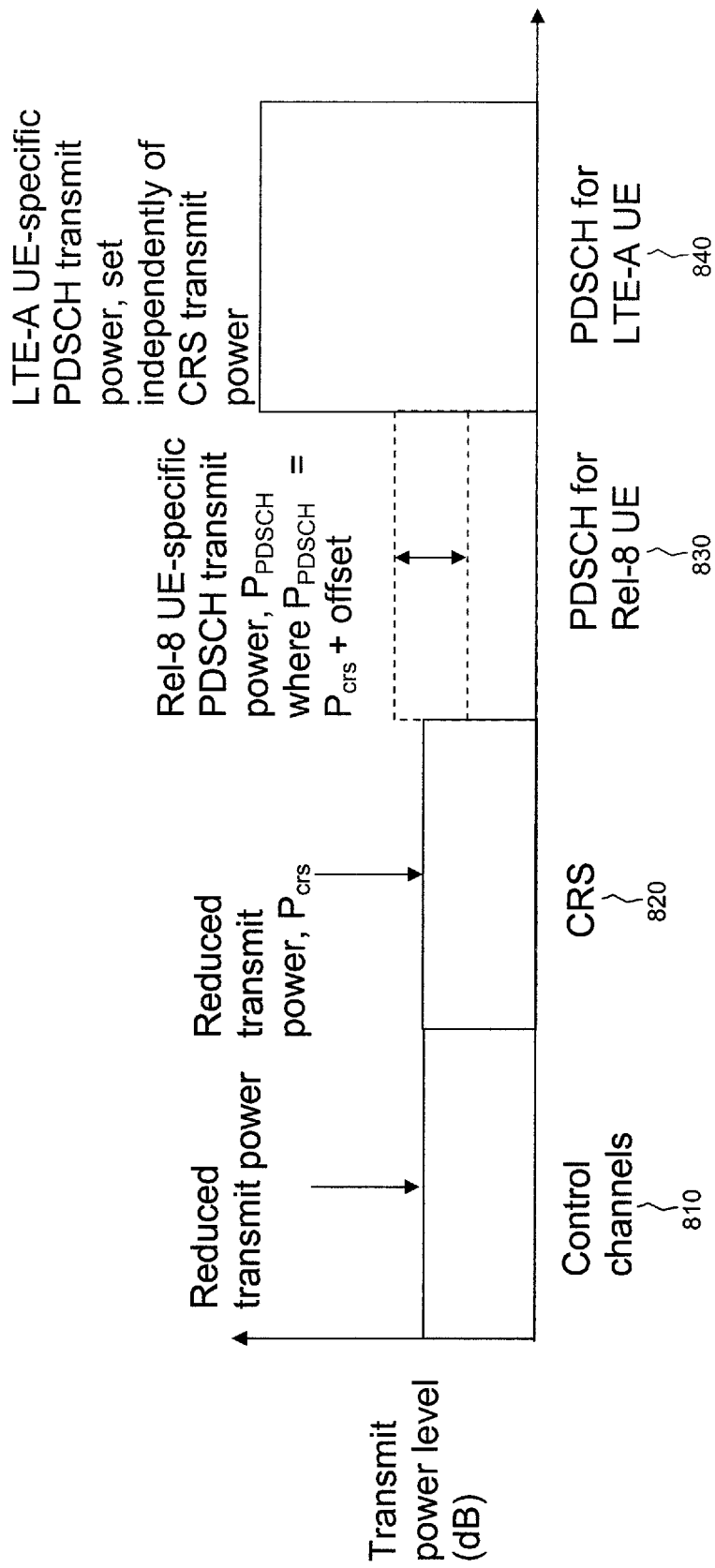
FIG. 8 illustrates the relative transmit power levels of the control channels, the CRS, the PDSCH for a legacy UE, and the PDSCH for an LTE-A UE, according to an embodiment of the disclosure.

This is concept illustrated in FIG. 8. The control channels 810 and the CRS 820 are transmitted at the same reduced transmit power, $P_{crs}$. The PDSCH 830 for a Rel-8 UE is transmitted at a transmit power that is offset from $P_{crs}$. The PDSCH 840 for an LTE-A UE is transmitted at a transmit power that is independent of the CRS transmit power.

Rel-8 UEs use the CRS to measure RSRP/RSRQ. Therefore, the measured RSRP/RSRQ will accurately reflect the control channel coverage. Unlike in the second concept described above, the eNB does not need to scale the RSRP/RSRQ thresholds in the measurement reporting criteria configured for the UE.

Similarly, an LTE-A UE can also use the CRS to measure RSRP/RSRQ for measurement reporting and cell selection/reselection purposes. Alternatively, an LTE-A UE can use the channel state information reference signal (CSI-RS) to measure RSRP/RSRQ. The CSI-RS is a low-density RS defined for LTE-A UEs to measure CQI and channel state information for Multiple Input Multiple Output (MIMO) channel feedback purposes. In an embodiment, the CSI-RS is transmitted at non-reduced power since it represents the achievable PDSCH transmit power for LTE-A UEs. In an embodiment, the information broadcast by the eNB on an SIB, such SIB Type 2 (SIB2), includes the CRS power or Energy per Resource Element (EPRE) and the CSI-RS power or EPRE.

An LTE-A UE can be configured to use the CRS or the CSI-RS for RSRP/RSRQ measurement and reporting. In one embodiment, in a backward compatible CC, the eNB can configure the UE via RRC (Radio Resource Control) signaling to use either the CRS or the CSI-RS for measurement and measurement reporting. In a non-backward compatible CC or extension CC, the UE is configured to use the CSI-RS for measurement and measurement reporting.

When an LTE-A UE is configured to perform measurement and measurement reporting based on the CSI-RS, similar schemes as provided with regard to the second concept described above can be applied to account for the reduced control channel transmit power compared to the CSI-RS transmit power.

In an embodiment, a second solution that addresses the PDCCH interference issues in heterogeneous networks and the drawbacks of the existing solutions for those issues is a non-carrier aggregation based solution wherein low power nodes transmit an extended PDCCH (E-PDCCH). Five concepts under this solution address the PDCCH interference problems described above in a non-carrier aggregation manner, since spectrum may not be abundant for the operators. This solution also addresses some of the drawbacks of the existing non-carrier aggregation based solutions described above.

In a first concept under this second solution, a low power node transmits the E-PDCCH and blanks/mutes or does not transmit the legacy control channel region. In a second concept under the second solution, a low power node transmits the E-PDCCH as well as the legacy control channel region. This allows the low power node to support legacy Rel-8 UEs. In a third concept under the second solution, the E-PDCCH region is configured with and without blanking of the legacy control channel region. In a fourth concept under the second solution, a new type of non-backward compatible carrier is defined for heterogeneous networks. In a fifth concept under the second solution, the macro eNB blanks/mutes certain OFDM symbols within its legacy control region or the PDSCH region to reduce the interference to low power nodes.

In each of these concepts, it may be preferable for co-channel (i.e., non-carrier aggregation) interference avoidance schemes to be supported since operators may not have sufficient spectrum to support multiple CCs, with some CCs being backward compatible and others not being backward compatible (e.g., extension carriers). Details of each of these concepts will now be provided.

In the first concept, the low power node transmits the E-PDCCH and blanks/mutes or does not transmit the legacy control channel region. The macro eNB transmits the legacy control channel region with full power, thus providing uniform control channel coverage for UEs in the macro cell area. To avoid interference from the macro eNB, in one embodiment, low power nodes located within the coverage area of the macro eNB do not transmit on the legacy control channel region. Instead, the E-PDCCH defined within the PDSCH region is transmitted by the low power node to carry PDSCH and PUSCH scheduling assignment information to UEs attached to the low power node. In one embodiment, the E-PDCCH transmission within the PDSCH region could be restrained in the frequency and time domains (and even in the RBs) to allow more controllable interference coordination. In this case, the low power node may not support legacy Rel-8 or Rel 9 UEs.

Figure 9:
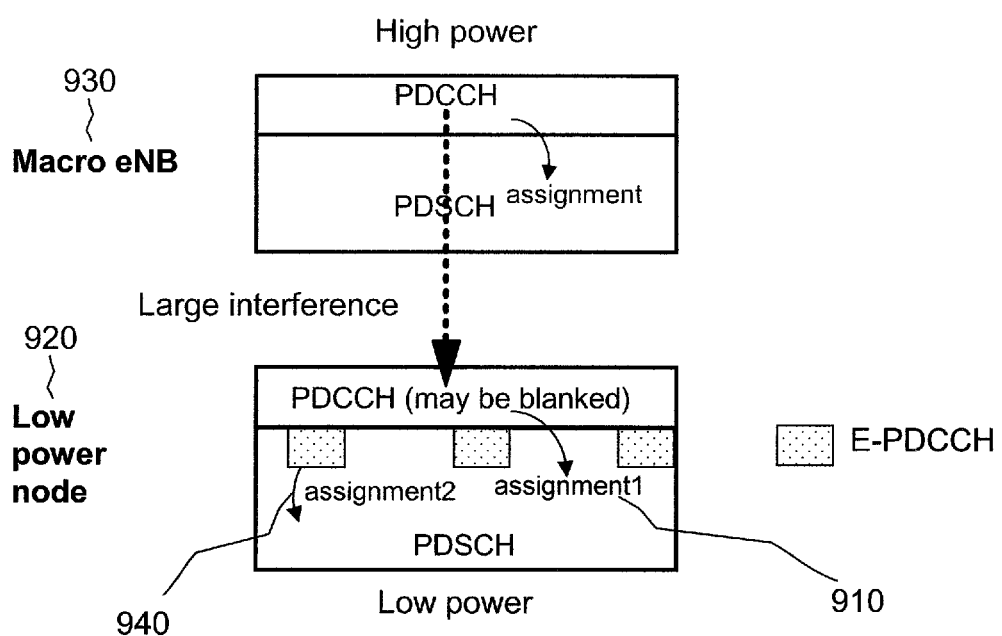
FIG. 9 illustrates an E-PDCCH (Extended PDCCH) transmission by a low power node, according to an embodiment of the disclosure.

In the second concept, the low power node transmits the E-PDCCH. The low power node also transmits the control channels in the legacy control channel region for UEs which are located close to the low power node and experience low interference from the macro eNB. This is shown in FIG. 9 as 'assignment1' 910. For UEs which are located farther away from the low power node 920 and experience higher interference from the macro eNB 930, their control channel information is carried in the E-PDCCH. This is shown in FIG. 9 as 'assignment2 940'. Since legacy Rel-8 UEs do not support the E-PDCCH, when a legacy Rel-8 UE is close to the low power node 920, it is served by the low power node 920. When a legacy UE is farther away from the low power node 920, it is served by the macro eNB 930. On the other hand, LTE-A UEs can be served by the low power node 920 with a larger coverage area due to the use of the E-PDCCH. In some embodiments, the 'assignment 1' 910 not only contains the scheduling information for the UE, but also contains the scheduling information of the 'assignment 2' 940. In this case, it may be preferable to use the highest CCE aggregation level for 'assignment 1' 910.

In the third concept, the E-PDCCH region is configured with and without blanking of the legacy control channel region. When the control channel region of a low power node is not blanked, the PDCCH transmitted in the legacy control channel region can carry a new DCI defined to carry information related to the configuration of the E-PDCCH region, such as the resources (e.g., in terms of RBs and/or the number of OFDM symbols) allocated to the E-PDCCH region, the CCE aggregation level used in the E-PDCCH region, etc. In one embodiment, the resources of the E-PDCCH region could simply be defined by the RBs indicated by the new DCI. For example, one RB could carry the E-PDCCH information. TDM/FDM multiplexing within a subframe can be applied to the multiplexing of the PDSCH region and one or more E-PDCCH regions. In that case, the starting position and the ending position of the OFDM symbols within those assigned RBs for an E-PDCCH region may be semi-statically notified through RRC signaling. In another embodiment for the case of TDM/FDM multiplexing, the starting position and the ending position of the OFDM symbols within those assigned RBs for an E-PDCCH region may be also notified by the new DCI.

A large CCE aggregation level (greater than 8 CCEs) can be used for the new DCI to improve the robustness of its reception by UEs located farther away from the low power node. In one embodiment, an LTE-A UE served by the low power node can be semi-statically configured (e.g., through RRC signaling) to blind decode a set of aggregation levels which may be different from those defined for Rel-8 (i.e., aggregation levels 1-8). For example, such an LTE-A UE could be configured to blind decode aggregation levels 4-16 in the legacy PDCCH region in order to obtain extra coding gain on the PDCCH broadcast by the low power node.

An E-PDCCH group RNTI can be introduced to scramble the new DCI. (Scrambling of a DCI is defined as scrambling the CRC (Cyclic Redundancy Check) value corresponding to the DCI contents with a RNTI value.) The E-PDCCH group RNTI is assigned to a group of LTE-A UEs that need to decode the E-PDCCH for scheduling assignment information. There can be multiple E-PDCCH regions defined for different groups of LTE-A UEs. Each of these E-PDCCH regions is indicated by a new DCI transmitted in the legacy control region. Each of the new DCIs is scrambled by the corresponding E-PDCCH group RNTI. It is also possible that multiple DCIs may be transmitted over the same region.

Another option under the third concept is to define a new E-PCFICH channel with a predefined resource location within the legacy control region or the PDSCH region to carry the location/size information of the E-PDCCH region.

Alternatively, when the control channel region of a low power node is blanked, or even if it is not blanked, the E-PDCCH region information can be signaled to the UEs via broadcast, multi-cast (using the E-PDCCH group RNTI), or dedicated RRC signaling.

In another embodiment under the third concept, a combination of new DCI and RRC signaling can be used to indicate the E-PDCCH region information. For example, the RRC signaling could indicate the semi-static configuration, such as the RBs used for the E-PDCCH region and the transmission format (e.g. MIMO transmission mode, aggregation levels of the E-PDCCH etc.), whereas the new DCI could indicate the number of symbols within those RBs that are used for the E-PDCCH region. In another example, the new DCI could indicate the start and end index of symbols within those RBs that are used for the E-PDCCH region. In yet another example, the RRC signaling could indicate the different possible sets of RBs used for the E-PDCCH region, whereas the new DCI could indicate the specific set of RBs used for the E-PDCCH region for the corresponding subframe where the new DCI is transmitted.

In one embodiment, the size of this new DCI is set to the size of one of the existing Rel-8 DCI formats in order to reduce the decoding complexity. In another embodiment, the new DCI is confined within a reduced search space of the PDCCH region, e.g., the common search space.

In the fourth concept, a new type of non-backward compatible carrier is defined. In this new carrier, the legacy control channel region is blanked. That is, there is no legacy PCFICH, PDCCH, or PHICH transmission. Also, one or more E-PDCCH regions are configured. The partial or full configuration of some or all of the E-PDCCH regions can be signaled through broadcast RRC signaling such as the MIB. This type of carrier is fully accessible by LTE-A UEs and can be camped on by LTE-A UEs in Idle mode. It can also be assigned to LTE-A UEs as a standalone CC. A UE accessing the carrier/cell would first read the MIB to understand the configuration of one or more E-PDCCH regions and then subsequently read SIB1, SIB2, etc., based on the PDSCH scheduling assignment sent on those E-PDCCH regions. One or more of the E-PDCCH regions could also carry the LTE-A PHICH for sending a downlink ACK/NACK to acknowledge an uplink PUSCH transmission from a UE.

In the fifth concept, the macro eNB blanks/mutes certain OFDM symbols within its legacy control region or the PDSCH region. Both the macro eNB and the HeNB transmit in the legacy control region. To aid in the service of Rel-8 UEs by the HeNB, the macro eNB could signal (through the PCFICH) that in a subframe, it will have N symbols for PDCCH transmission, but could apply additional coding to the PDCCHs (i.e., increase the aggregation level) and puncture the entire Nth symbol. To avoid the impact of blanking on the PHICH, the PHICH duration can be limited to being less than N symbols, which can be configured by RRC signaling. In the subframe for which that occurs, the HeNBs could also indicate (through the PCFICH) N (or more) symbols for the legacy control region. Because of the puncturing of the Nth symbol by the macro eNB, the REs in the Nth symbol at the HeNBs would experience improved SINR, thus improving a Rel-8 UE's reception of the HeNB PDCCHs. The decision by the macro eNB to puncture the Nth symbol of the control region could occur in response to a request from the HeNB or could occur according to a pre-arranged pattern of subframes. In one embodiment, the subframe start position of the HeNB is time shifted so as to align with what would normally be expected to be the punctured Nth symbol of the macro eNB control region so that when the macro eNB punctures the Nth symbol, the first symbol of the HeNB control region would experience no interference.

In another embodiment under the fifth concept, the macro eNB could advertise (through the PCFICH) that in a subframe, it will have N symbols for PDCCH transmission. The HeNB could advertise that in the same subframe, it will have M symbols for PDCCH transmission, where M is greater than N. The macro eNB could blank the PDSCH transmission on the (N+1)th to Mth symbols within its subframe. This will reduce the interference caused to the HeNB's control region from symbol (N+1) to symbol M. To reduce the impact of PDSCH blanking on Rel-8 UEs, a more conservative modulation and coding set can be assigned to the Rel-8 UEs because the performance of PDSCH will be degraded due to the puncturing of PDSCH coded bits. For LTE-A UEs, the eNB can send separate signaling (e.g., RRC signaling or a new DCI) to inform those UEs of the symbols on which PDSCH blanking occurs or the actual starting OFDM symbol of the PDSCH transmission. In this case, the LTE-A UEs receive PDSCH transmission on the symbols which are not blanked and can avoid the puncturing loss.

In an embodiment, a third solution that addresses the PDCCH interference issues in heterogeneous networks and the drawbacks of the existing solutions for those issues is, like the second solution, a non-carrier aggregation based solution. In the second solution, the use of the E-PDCCH for control channel interference management was described. In the third solution, additional concepts for the E-PDCCH are provided.

Five concepts under this solution address the PDCCH interference problems described above in a non-carrier aggregation manner, since spectrum may not be abundant for the operators. This solution also addresses some of the drawbacks of the existing non-carrier aggregation based solutions described above.

The first concept deals with the design of the DM-RS for the E-PDCCH to support adequate channel estimation performance of the E-PDCCH. The second concept deals with the uplink HARQ ACK/NACK timing for the PDSCH assigned by the E-PDCCH. The third concept provides methods to support different transmission modes for the E-PDCCH which can benefit different UEs' location and channel conditions. The fourth concept uses a cross carrier indication for the E-PDCCH region. The fifth concept deals with the transmission of the E-PDCCH on the blanked/muted OFDM symbols by a macro eNB within its legacy control region or the PDSCH region. Details of these five concepts will now be provided.

As previously described, an E-PDCCH region may consist of multiple contiguous or non-contiguous RBs and may occupy a subset of OFDM symbols within those RBs. An E-PDCCH may consist of CCEs and REGs that spread across the allocated RBs and OFDM symbols within the E-PDCCH region, in a similar fashion as the interleaving procedure of the Rel-8 PDCCH. To provide good channel estimation for each of the REGs/CCEs that form an E-PDCCH, in an embodiment of the first concept under the third solution, an RB-based DM-RS design is defined for the E-PDCCH. This means that each RB within the E-PDCCH region consists of sufficient DM-RS for good channel estimation within the RB.

Figure 10:
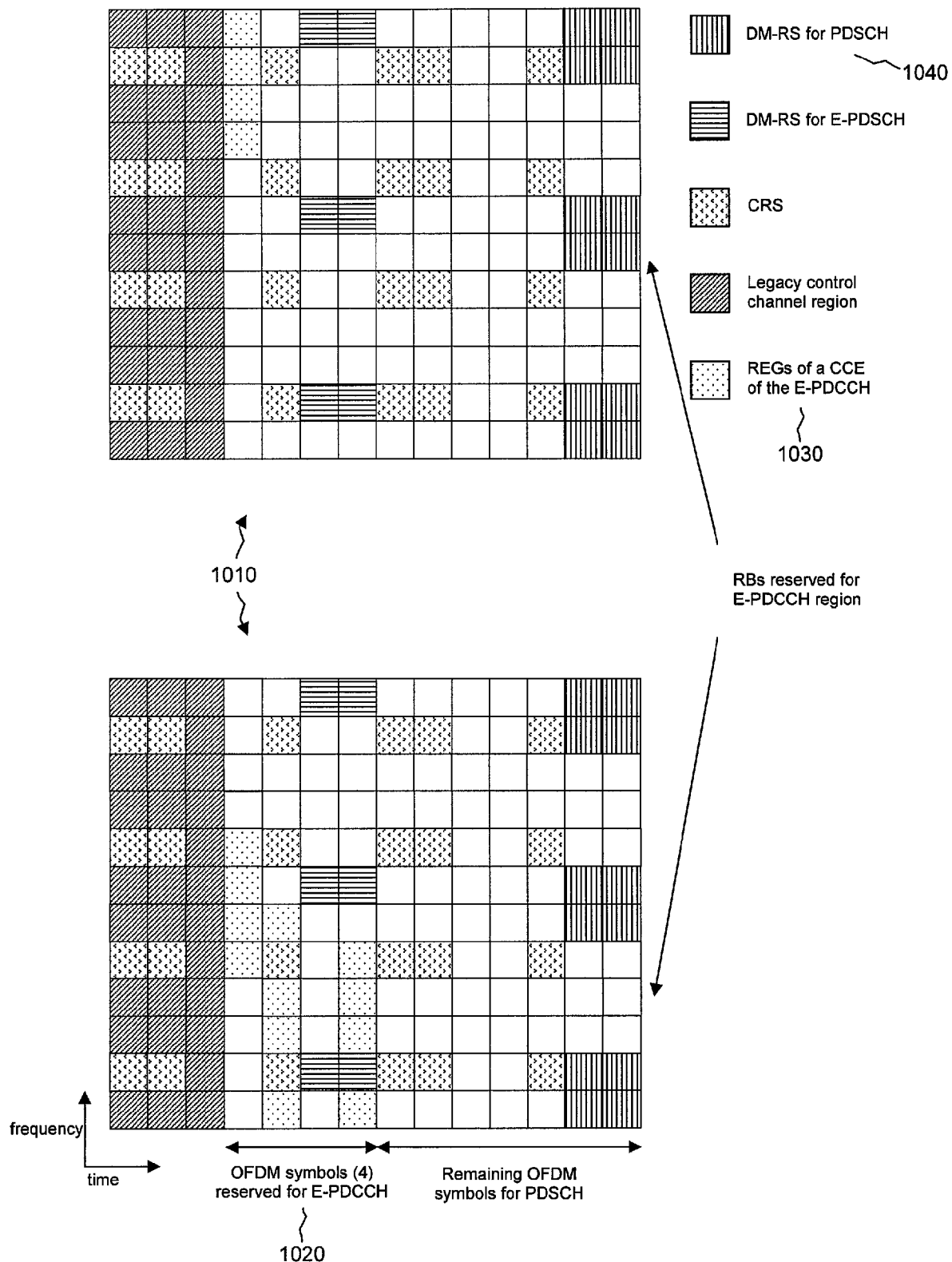
FIG. 10 illustrates a reference signal design for an E-PDCCH, according to an embodiment of the disclosure.

In an embodiment, a DM-RS pattern similar to those defined for the LTE-A PDSCH can be reused for the E-PDCCH DM-RS. The E-PDCCH region and the PDSCH region share the same set of available DM-RS RE locations within an RB for their respective DM-RS transmissions. An example of the E-PDCCH region and an E-PDCCH DM-RS pattern within a normal subframe (i.e., non-MBSFN subframe) and in a backward compatible carrier is shown in FIG. 10. Two of the RBs 1010 reserved for the E-PDCCH region are shown in the figure. The first four of the OFDM symbols 1020 within these two RBs 1010 are reserved for the E-PDCCH. REGs 1030 that form a CCE of the E-PDCCH are distributed across the two RBs 1010 and the four OFDM symbols 1020. In FIG. 10, an example of an E-PDCCH DM-RS of two antenna ports is shown. If the E-PDCCH is transmitted with only rank one, then the adjacent DM-RS RE pairs can be reduced to one DM-RS RE. In one embodiment, the E-PDCCH DM-RS are transmitted with an E-PDCCH region-specific transmission format (i.e., precoding, rank and transmit power) which is aligned with the E-PDCCH transmission format in the corresponding E-PDCCH region. The E-PDCCH DM-RS and the PDSCH DM-RS 1040 are used separately for demodulation of the E-PDCCH and the PDSCH, respectively. Therefore, the E-PDCCH DM-RS and the PDSCH DM-RS 1040 can be transmitted with different transmission modes.

From FIG. 10, it can be seen that by dividing OFDM symbols within an RB between the E-PDCCH and the PDSCH and by sharing the available DM-RS RE locations within the RB, the available DM-RS REs are split between the E-PDCCH region and the PDSCH region. Depending on the boundary between the E-PDCCH region and the PDSCH region, the channel estimation performance may be affected if the REs belonging to the E-PDCCH or PDSCH are too far from the corresponding DM-RS REs. Therefore, it may be better to use all the OFDM symbols within an RB for the E-PDCCH. This may also simplify the signaling of the E-PDCCH resources. That is, the partition between the E-PDCCH region and the PDSCH region might be RB-based.

Alternatively, the E-PDCCH region and the PDSCH region within an RB might not share the same set of available DM-RS RE locations. The E-PDCCH DM-RS might be transmitted on a predefined set of REs within an RB that does not coincide with the Rel-8 CRS, the legacy control region, and the PDSCH DM-RS. In one embodiment, the E-PDCCH DM-RS can be transmitted on OFDM symbols that are not defined for the E-PDCCH region within an RB. Similarly, the PDSCH DM-RS can be transmitted on a predefined set of REs within an RB that does not coincide with the Rel-8 CRS, the legacy control region, and the E-PDCCH DM-RS. In one embodiment, the PDSCH DM-RS can be transmitted on OFDM symbols that are not defined for the PDSCH region within an RB.

In an embodiment, multiple E-PDCCH regions are defined within a subframe, and each E-PDCCH region has a region-specific DM-RS with its own transmission format. Each E-PDCCH region may be associated with a group of LTE-A UEs with a specific preferred transmission format. An E-PDCCH region and its associated group of UEs may be updated from time to time. As described with regard to the third concept under the second solution, if a new DCI is defined in the legacy PDCCH region to indicate the configuration information of a particular E-PDCCH region, the new DCI might be scrambled by the E-PDCCH group RNTI assigned to the group of UEs associated with the particular E-PDCCH region. The eNB can signal an LTE-A UE with the E-PDCCH region(s) and the corresponding configuration information assigned to the UE. In an embodiment, an LTE-A UE can also be signaled with the resource location of other E-PDCCH region(s) in the subframe in order for the LTE-A UE to know the boundary of the PDSCH region in different RBs within the subframe.

It is typically preferable that the E-PDCCH region not be punctured by the transmission of CSI-RS REs. In one embodiment, the CSI-RS is not transmitted on RBs where the E-PDCCH region is defined. In another embodiment, the CSI-RS is not transmitted on the OFDM symbols within the RBs where the E-PDCCH region is defined. In this case, in one RB which is allocated to the E-PDCCH, only part of the CSI-RS may be transmitted. This information may be signaled to the UE in order to ensure an accurate CSI-RS based measurement by the UE. However, to maintain the accuracy of the CSI measurement, the E-PDCCH region may also include the CSI-RS transmission. In an embodiment, the allocation of the REs for the E-PDCCH within the E-PDCCH region excludes the REs for the CSI-RS, and the rate matching of the E-PDCCH takes that exclusion into account.

In an embodiment of the second concept under the third solution, uplink HARQ ACK/NACK timing for the PDSCH assigned by the E-PDCCH is provided. As described with regard to the first concept under the third solution, it may be preferable to use RB-based partitioning between the E-PDCCH region and the PDSCH region. In that case, E-PDCCH decoding at the UE may start only after the last OFDM symbol of a subframe. If the same uplink HARQ ACK/NACK timing as defined in Rel-8 is used (that is, the uplink HARQ ACK/NACK is transmitted on the fourth subframe after the subframe where the PDSCH is received), there may not be sufficient time for the UE to decode the E-PDCCH and the corresponding PDSCH. In an embodiment, one more subframe is added to the uplink HARQ ACK/NACK transmission time for the PDSCH that is assigned by the scheduling grant sent on the E-PDCCH. A UE can be configured to receive the scheduling assignment on either the legacy PDCCH or the E-PDCCH. When a UE is configured to receive the PDCCH, the regular uplink HARQ ACK/NACK timing of four subframes can be used. When a UE is configured to receive the E-PDCCH, an additional subframe can be added. That is, five subframes of uplink HARQ ACK/NACK timing are used.

In another embodiment, a UE can be configured to receive the scheduling assignment on either the legacy PDCCH or the E-PDCCH. When a UE receives the PDSCH scheduling grant on the PDCCH, the regular uplink HARQ ACK/NACK timing of four subframes can be used to send the ACK/NACK for this PDSCH. When a UE receives the PDSCH scheduling grant on the E-PDCCH, the HARQ ACK/NACK timing of five subframes can be used to send the ACK/NACK for this PDSCH.

In an embodiment, the downlink HARQ timing can remain at eight milliseconds (or eight subframes) round trip time (RTT) as in Rel-8 if the eNB can process the uplink HARQ ACK/NACK on the fourth or fifth subframe for the cases of PDCCH and E-PDCCH, respectively, and schedule the retransmission in time on the eighth subframe. In another embodiment, a downlink HARQ timing of 10 milliseconds (or 10 subframes) RTT is used when a UE is configured to receive the E-PDCCH. In another embodiment, a downlink HARQ timing of 16 milliseconds (or 16 subframes) RTT is used when a UE is configured to receive the E-PDCCH.

In an embodiment of the third concept under the third solution, the E-PDCCH can be configured with different transmission modes. For example, transmit diversity or rank one precoding/beamforming modes may be used to improve the coverage of the E-PDCCH. In an embodiment, in the case of rank one precoding/beamforming, the Rel-8 mode 7 UE-RS pattern can be used for the E-PDCCH DM-RS within the OFDM symbols defined for the E-PDCCH region in an RB. In the case of transmit diversity, the E-PDCCH DM-RS can reuse the same pattern as the LTE-A PDSCH DM-RS as described with regard to the first concept under the third solution.

The transmission mode can be configured per E-PDCCH region, and the same transmission mode can be applied to all the E-PDCCH transmissions within the E-PDCCH region. In another embodiment, all the E-PDCCH regions have the same transmission mode configured. The transmission mode associated with an E-PDCCH region can be semi-statically configured and signaled via dedicated, multicast or broadcast RRC signaling. Alternatively, the transmission mode can be dynamically signaled using the new DCI described with regard to the third concept under the second solution. In yet another embodiment, the transmission mode of an E-PDCCH region can be signaled by an E-PDCCH transmitted on a reference or primary E-PDCCH region.

In an embodiment of the fourth concept under the third solution, cross carrier indication of the E-PDCCH region is used. As described with regard to the second solution, the E-PDCCH region can be used to avoid strong interference on the legacy control region. Therefore, instead of using the new DCI transmitted on the legacy control region on the same CC to indicate the E-PDCCH region configuration information, the new DCI can be transmitted on the legacy control region of another CC. This other CC does not experience severe interference on the legacy control region. A carrier indication field (CIF) is added to the new DCI to indicate the carrier where the E-PDCCH region is transmitted.

In another embodiment, cross carrier indication and scheduling can also be applied to the E-PDCCH where a transmission of the E-PDCCH on one CC indicates an E-PDCCH region on another CC and/or a PDSCH assignment on another CC. In this case, the UE attached to the low power node only monitors the E-PDCCH region it is assigned in order to save the UE's power. When cross indication is used, the resource location of the E-PDCCH region(s) of another carrier is signaled to the UE as well so that the UE can correctly decode the PDSCH assignment on another carrier.

An embodiment of the fifth concept under the third solution involves transmission of the E-PDCCH on the blanked/muted OFDM symbols by a macro eNB within its legacy control region or the PDSCH region. As described with regard to the fifth concept under the second solution, a macro eNB may be able to limit the number of OFDM symbols within its legacy control region or the PDSCH region. In an embodiment, the E-PDCCH can be transmitted by the low power node on the OFDM symbol that corresponds to this blanked OFDM symbol of the macro eNB. Since this OFDM symbol would experience improved SINR, E-PDCCH performance can be improved without the additional reservation of resource blocks in the PDSCH region of the macro eNB for inter-cell interference coordination purposes. However, since one OFDM symbol is reserved for the E-PDCCH, spectral efficiency would be degraded if a small number of DCIs are transmitted with the E-PDCCH. In one embodiment, multiple OFDM symbols are blanked/muted by the macro eNB, which allows multiple OFDM symbols to be used for the E-PDCCH at the low power node. It is also possible that only some of the subcarriers of the OFDM symbols are blanked/muted by the macro eNB to allow E-PDCCH transmission at the low power node.

In one embodiment, the third solution and fourth solution described above on E-PDCCH and their associated concepts can also be applied to the macro cell, where the macro cell can transmit E-PDCCH in the cases of heterogeneous network deployment and homogeneous network deployment.

In an embodiment, a fourth solution addresses the case where a UE is attached to a macro cell and experiences PDCCH interference from a femto cell associated with a CSG. When a low power node is a CSG cell, a UE that does not have a subscription to the CSG might attach to a macro cell. If the UE is close to the low power node, the UE might experience strong interference from the low power node. In order to reduce or avoid the interference from the low power node on the control channels (PDCCH, PCFICH, PHICH) transmitted by the macro cell, in one embodiment, the low power node blanks the control channel region on one or more of its CCs. UEs served by the CSG cell might receive scheduling assignments on the E-PDCCH on those CCs. Alternatively, UEs served by the CSG cell might receive cross carrier scheduling assignments from the PDCCH transmitted on those CCs whose control channel region is not blanked. In the latter case, the E-PDCCH may not be needed, and only the cross-carrier scheduling might be relied on. On those CCs where the CSG cell blanks the control channel region, legacy Rel-8 UEs cannot be supported. In another embodiment, the legacy control region of the low power node is not blanked/muted. An LTE-A UE that is served by the macro cell and experiences severe interference from the low power node on a CC will receive PDSCH and PUSCH grants on the E-PDCCH transmitted by the macro cell on the CC.

In an embodiment, a fifth solution that addresses the PDCCH interference issues in heterogeneous networks and the drawbacks of the existing solutions for those issues involves applying control region blanking or transmit power reduction to certain chosen subframes. This solution addresses the PDCCH interference problems described above while limiting the impact of PDCCH blanking/muting or reducing the PDCCH transmit power to certain configured subframes, such as MBSFN subframes or LTE-A subframes.

In an embodiment under the fifth solution, instead of blanking the control channel region on the entire CC, the macro eNB or the low power node (for the case of a CSG cell) applies blanking only on the control region of certain chosen subframes. In this way, the impact to the PDSCH and PUSCH scheduling assignment from the macro eNB or low power node is limited to only those chosen subframes. On the chosen subframes where the control channel region is blanked from the dominant interferer (i.e., the macro eNB or the low power node), the interfered low power node or macro eNB can schedule the UEs that are farther away from itself and closer to the dominant interferer.

It may be preferable that the chosen subframes, where the macro eNB or low power node blanks the control channel region, not be used to transmit system information or paging by the macro eNB or low power node, respectively. The chosen subframes could be in a fixed pattern within a certain time duration, and the fixed pattern could be activated or deactivated with an "activate" command or a "deactivate" command or could be dynamic on the subframe level. In the case of a fixed pattern, an example could be that the chosen subframe starts from subframe index 3 of a particular radio frame, repeats every 10 subframes, and then stops after 303 subframes. This is beneficial in supporting the semi-persistent scheduling (SPS) service. The activation and deactivation could be done over the PDCCH using the virtual CRC concept, where additional fields in a DCI are set to known specified values in order to increase the detection probability of a false positive PDCCH detection.

Rel-8 UEs may be able to be supported on the CC where control channel region blanking is applied on certain chosen subframes if those subframes are configured by the eNB via broadcast signaling as MBSFN subframes and if the CRS is transmitted on the first two symbols of each MBSFN subframe.

In another embodiment under the fifth solution, instead of reducing the control channel transmit power on the entire CC as proposed in the first solution, the macro eNB reduces the control channel transmit power on certain chosen subframes. In this way, the macro eNB can still serve some of its UEs which are close to the macro eNB on those subframes. In one embodiment, those chosen subframes can be MBSFN subframes so that the control channel coverage to Rel-8 UEs is not affected on regular subframes. The transmit power of the CRS in the first two symbols of these MBSFN subframes is not reduced so as not to impact the channel estimation performance of the Rel-8 UEs. On those chosen subframes, the low power node can schedule its UEs which are farther away from the low power node and closer to the macro eNB. It may be preferable that those chosen subframes not be used to transmit system information or paging by the macro eNB. The chosen subframes could be in a fixed pattern within a certain time duration and the fixed pattern could be activated or deactivated with an "activate" command or a "deactivate" command or could be dynamic on the subframe level. In the case of a fixed pattern, an example could be that the chosen subframe starts from subframe index 3 of a particular radio frame, repeats every 10 subframes, and then stops after 303 subframes.

In an embodiment, a sixth solution that addresses the PDCCH interference issues in heterogeneous networks and the drawbacks of the existing solutions for those issues involves a low power node transmitting on MBSFN subframes of a macro cell. This solution addresses the PDCCH interference problems described above while leveraging the existing MBSFN subframes feature to avoid PDCCH blanking/muting on the macro cell.

As in Rel-8, the control region for MBSFN subframes is limited to a maximum of two OFDM symbols. If the macro cell is already using MBSFN subframes for some purpose (e.g., using MBSFN subframes to support LTE-A UEs or to send MBMS (Multimedia Broadcast/Multicast Service) data), the macro eNB can provide the MBSFN subframe configuration to the low power nodes within its coverage area via X2 or S1 signaling or via a SON manager. In an embodiment, a low power node may detect the MBSFN subframe configuration of a macro cell by reading SIB2 of the macro cell (plus SIB2 of any neighboring cells) to look for the mbsfn-SubframeConfigList information element. The neighCellConfig information element in SIB3 could also potentially be used to infer the MBSFN subframe configurations of intra-frequency cells neighboring the macro cell.

Based on the information obtained in this way, the low power cell knows in which subframes the macro cell will be transmitting a PDCCH that is guaranteed to be shorter than three OFDM symbols. If there are sufficient MBSFN subframes and the total traffic load on the low power cell is not excessive, the low power cell can try to direct most or all of its transmissions into these (macro cell) MBSFN subframes and can use a PDCCH length of three OFDM symbols (where at least the third OFDM symbol will not overlap with the macro cell's PDCCH). In another embodiment, the low power cell directs its transmissions to UEs that are more severely interfered with by the macro cell during these (macro cell) MBSFN subframes in order to improve the probability of success in PDCCH decoding for those UEs. The macro cell may or may not reduce its control channel transmission power during these MBSFN subframes. In an embodiment, the macro cell blanks its transmission (PDSCH and/or Physical Multicast Channel (PMCH)) on the third OFDM symbol of some or all of the MBSFN subframes to avoid interference to the low power cell. The impact of blanking to the Rel-8 UEs scheduled on those MBSFN subframes can be mitigated by choosing a lower modulation and coding scheme for the Rel-8 UEs.

In some embodiments, the macro eNB only transmits the PMCH for MBMS data on certain MBSFN subframes. This can occur when a continuous set of the MBSFN subframes are allocated and the necessity to transmit the PDCCH and PHICH from the macro eNB is avoided for some MBSFN subframes. In those MBSFN subframes, there is no PDCCH transmitted by the macro eNB, and therefore the interference to the control region of low power nodes is greatly reduced. The macro eNB can inform a low power node of such MBSFN subframes via X2 or S1 signaling or via a SON manager. The low power node can try to direct most or all of its transmissions into these (macro cell) MBSFN subframes. In another embodiment, the low power node directs its transmissions to UEs that are more severely interfered with by the macro cell during these (macro cell) MBSFN subframes where only the PMCH is transmitted.

This approach may not work as well for ongoing uplink grants (DCI 0) for uplink HARQ retransmissions and PHICH (Physical HARQ Indicator Channel) transmission, due to the uplink HARQ synchronous period of 8 ms (which does not match the MBSFN periodicity of 10 or 40 ms). Also, this approach is dependent upon the macro cell actually using MBSFN subframes and using a sufficient density of MBSFN subframes that the low power cell can take advantage of them.

The low power cell may not necessarily restrict itself to only using the macro cell's MBSFN subframes. However, if traffic loading permits, the low power cell could try to take maximum advantage of the macro cell's MBSFN subframes where possible and avoid the macro cell's non-MBSFN subframes where possible, at least for UEs that experience strong interference from the macro cell.

In one embodiment, the macro cell and low power cell radio frame is shifted by some number of subframes such that the macro cell can configure MBSFN subframes on those subframes where the low power cell transmits the SIBs. In another embodiment, the macro eNB configures MBSFN subframes on the corresponding subframes in which the low power cell transmits SIBs. Due to the relatively large periodicity of the SIB transmissions from the low power node, the macro eNB does not need to configure many MBSFN subframes for this purpose, which may end up wasting the spectrum resource. This can be coordinated between macro eNB and low power nodes via X2 or S1 interface signaling or via the SON manager. The S1/X2 signaling between macro eNB and low power nodes contains information related to when the macro eNB will configure MBSFN subframes and when the low power nodes will transmit SIBs.

Figure 11:
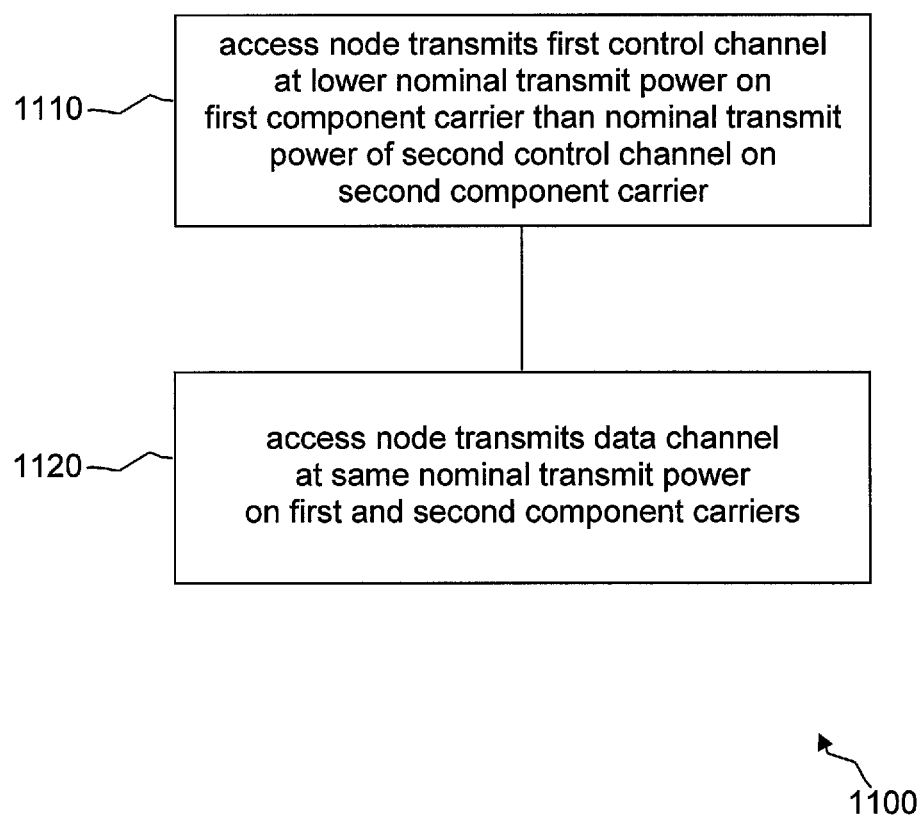
FIG. 11 illustrates an embodiment of a method for managing control channel interference, according to an embodiment of the disclosure.

FIG. 11 illustrates an embodiment of a method 1100 for managing control channel interference. At block 1110, an access node transmits a first control channel at a lower nominal transmit power on a first component carrier than the nominal transmit power of a second control channel on a second component carrier. At block 1120, the access node transmits a data channel at the same nominal transmit power on the first and second component carriers.

Figure 12:
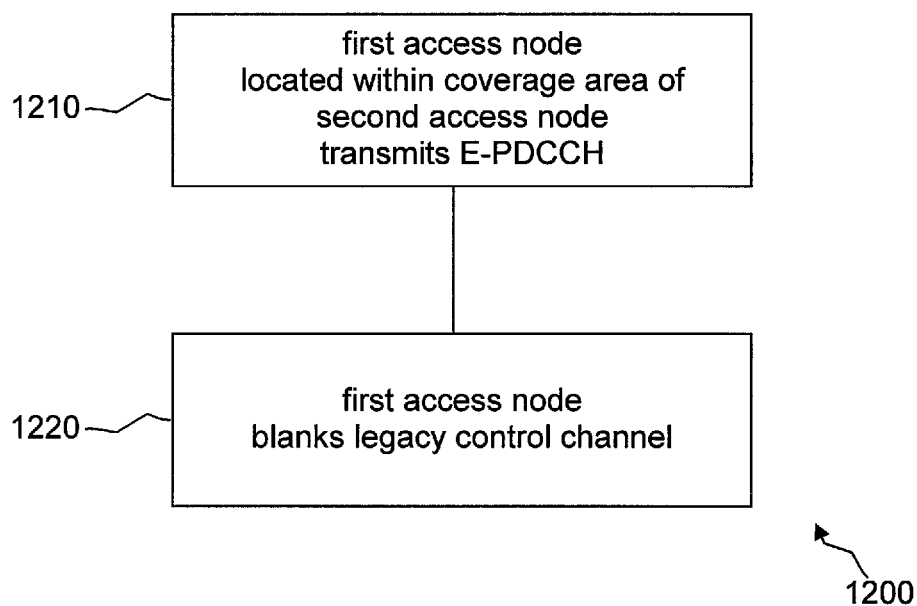
FIG. 12 illustrates an embodiment of a method for managing control channel interference, according to an alternative embodiment of the disclosure.

FIG. 12 illustrates an embodiment of an alternative method 1200 for managing control channel interference. At block 1210, a first access node located within the coverage area of a second access node transmits an E-PDCCH. At block 1220, the first access node blanks a legacy control channel. The second access node transmits the legacy control channel with the same nominal power as a downlink data channel. The E-PDCCH is defined within a downlink data channel region and transmitted by the first access node to carry downlink data channel and uplink data channel scheduling assignment information to UEs attached to the first access node.

Figure 13:
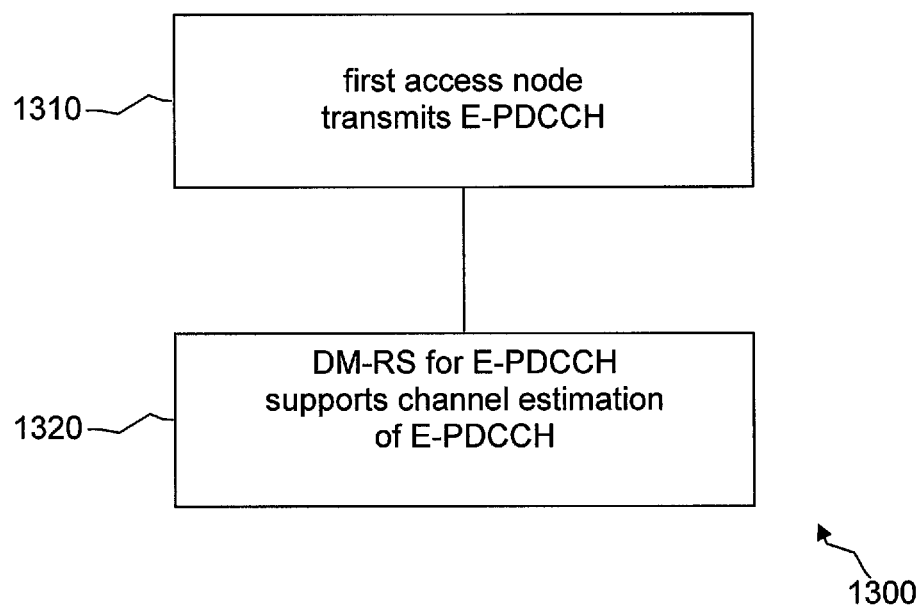
FIG. 13 illustrates an embodiment of a method for managing control channel interference, according to an alternative embodiment of the disclosure.

FIG. 13 illustrates an embodiment of an alternative method 1300 for managing control channel interference. At block 1310, a first access node transmits an E-PDCCH. At block 1320, a DM-RS for the E-PDCCH supports channel estimation of the E-PDCCH.

Figure 14:
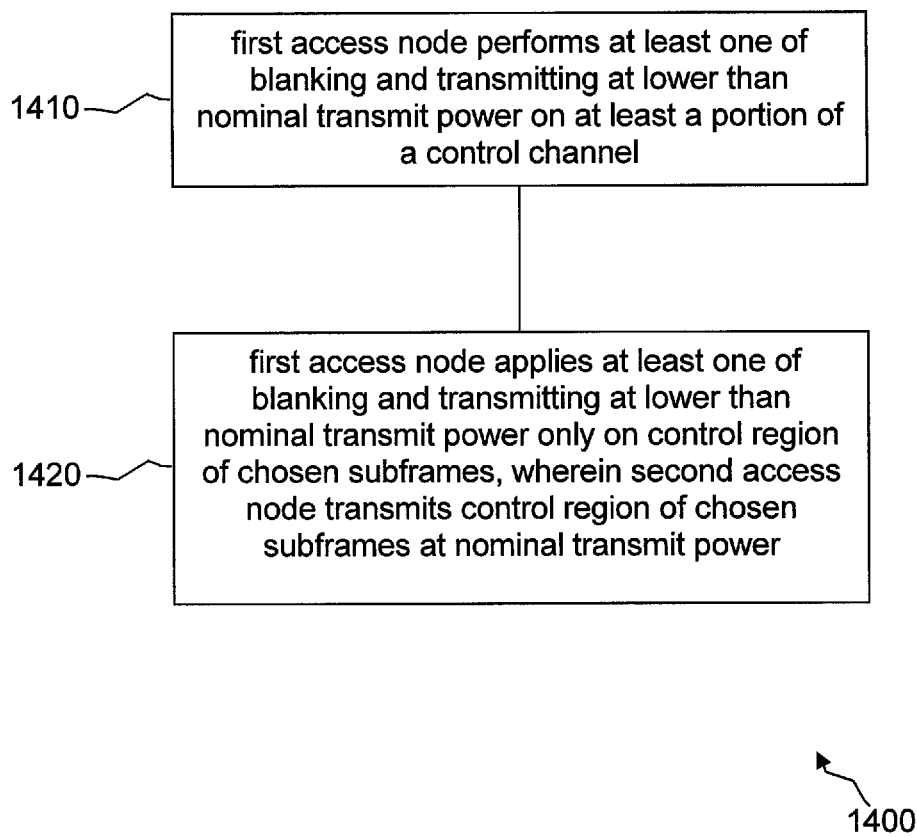
FIG. 14 illustrates an embodiment of a method for managing control channel interference, according to an alternative embodiment of the disclosure.

FIG. 14 illustrates an embodiment of an alternative method 1400 for managing control channel interference. At block 1410, a first access node performs at least one of blanking and transmitting at lower than nominal transmit power on at least a portion of a control channel. At block 1420, the first access node applies at least one of blanking and transmitting at lower than nominal transmit power only on the control region of chosen subframes, wherein the second access node transmits the control region of chosen subframes at nominal transmit power.

Figure 15:
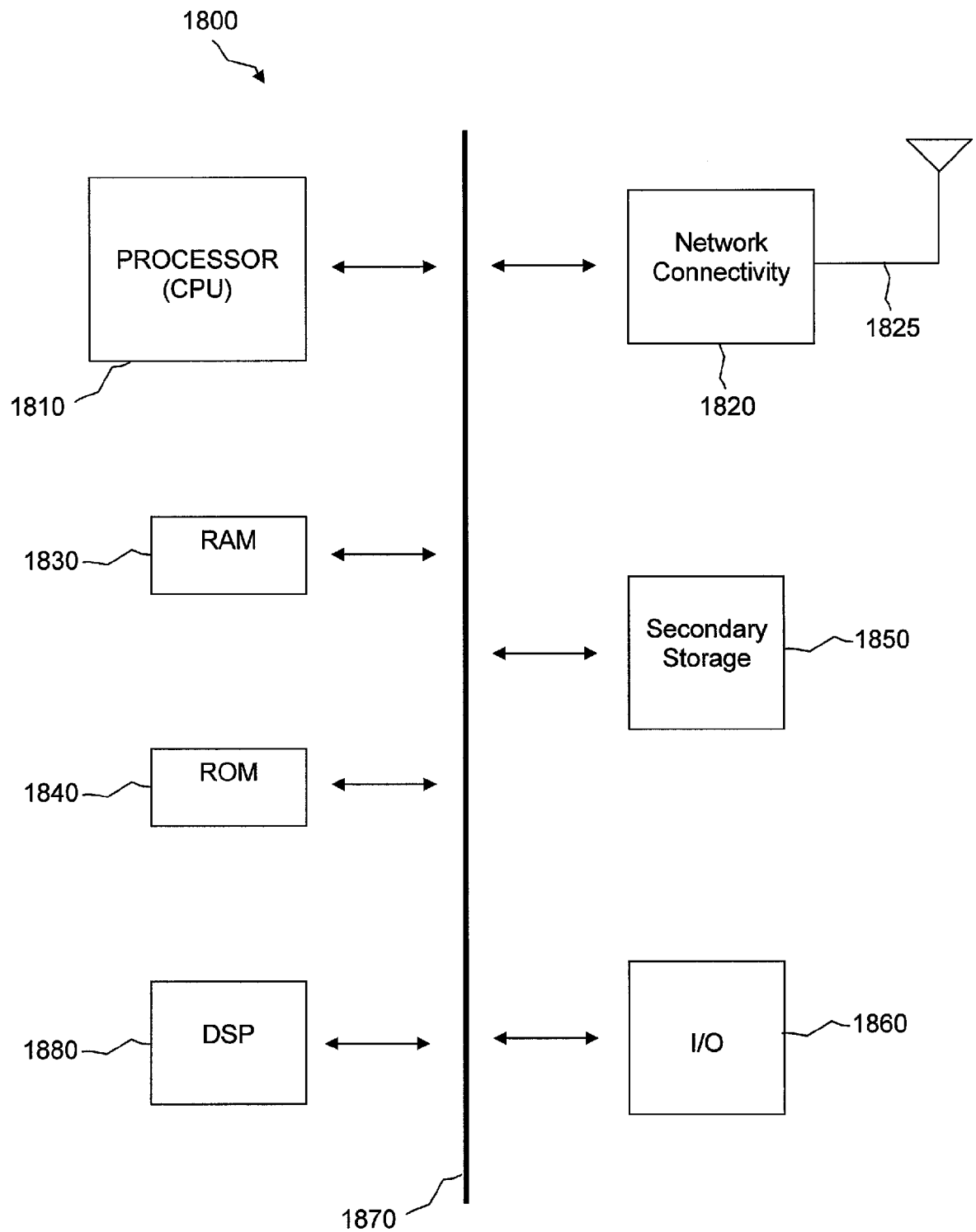
FIG. 15 illustrates a processor and related components suitable for implementing the several embodiments of the present disclosure.

The UEs, access nodes, and other components described above might include a processing component that is capable of executing instructions related to the actions described above. FIG. 15 illustrates an example of a system 1800 that includes a processing component 1810 suitable for implementing one or more embodiments disclosed herein. In addition to the processor 1810 (which may be referred to as a central processor unit or CPU), the system 1800 might include network connectivity devices 1820, random access memory (RAM) 1830, read only memory (ROM) 1840, secondary storage 1850, and input/output (I/O) devices 1860. These components might communicate with one another via a bus 1870. In some cases, some of these components may not be present or may be combined in various combinations with one another or with other components not shown. These components might be located in a single physical entity or in more than one physical entity. Any actions described herein as being taken by the processor 1810 might be taken by the processor 1810 alone or by the processor 1810 in conjunction with one or more components shown or not shown in the drawing, such as a digital signal processor (DSP) 1880. Although the DSP 1880 is shown as a separate component, the DSP 1880 might be incorporated into the processor 1810.

The processor 1810 executes instructions, codes, computer programs, or scripts that it might access from the network connectivity devices 1820, RAM 1830, ROM 1840, or secondary storage 1850 (which might include various disk-based systems such as hard disk, floppy disk, or optical disk). While only one CPU 1810 is shown, multiple processors may be present. Thus, while instructions may be discussed as being executed by a processor, the instructions may be executed simultaneously, serially, or otherwise by one or multiple processors. The processor 1810 may be implemented as one or more CPU chips.

The network connectivity devices 1820 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1820 may enable the processor 1810 to communicate with the Internet or one or more telecommunications networks or other networks from which the processor 1810 might receive information or to which the processor 1810 might output information.

The network connectivity devices 1820 might also include one or more transceiver components 1825 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1825 might include separate receiving and transmitting units or a single transceiver. Information transmitted or received by the transceiver component 1825 may include data that has been processed by the processor 1810 or instructions that are to be executed by processor 1810. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1830 might be used to store volatile data and perhaps to store instructions that are executed by the processor 1810. The ROM 1840 is a non-volatile memory device that typically has a smaller memory capacity than the memory capacity of the secondary storage 1850. ROM 1840 might be used to store instructions and perhaps data that are read during execution of the instructions. Access to both RAM 1830 and ROM 1840 is typically faster than to secondary storage 1850. The secondary storage 1850 is typically comprised of one or more disk drives or tape drives and might be used for non-volatile storage of data or as an over-flow data storage device if RAM 1830 is not large enough to hold all working data. Secondary storage 1850 may be used to store programs that are loaded into RAM 1830 when such programs are selected for execution.

The I/O devices 1860 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1825 might be considered to be a component of the I/O devices 1860 instead of or in addition to being a component of the network connectivity devices 1820.

The following are incorporated herein by reference for all purposes: 3GPP TS 36.213, 3GPP TS 36.331, and 3GPP TR 36.814.

In an embodiment, a method for managing control channel interference is provided. The method includes a first access node performing at least one of blanking and transmitting at lower than nominal transmit power on at least a portion of a control channel. The method further includes the first access node applying at least one of blanking and transmitting at lower than nominal transmit power only on the control region of chosen subframes, wherein a second access node transmits the control region of the chosen subframes at nominal transmit power.

In an alternative embodiment, another method for managing control channel interference is provided. The method includes a second access node providing a special subframe configuration to a first access node via at least one of X2 signaling, S1 signaling, a self organizing network (SON) manager, and a system information block, wherein the first access node transmits a control channel to at least one UE during at least one of the special subframes of the second access node.

In an alternative embodiment, a first access node is provided. The first access node includes a processor configured such that the first access node performs at least one of blanking and transmitting at lower than nominal transmit power on at least a portion of a control channel, and applies at least one of blanking and transmitting at lower than nominal transmit power only on the control region of chosen subframes, wherein a second access node transmits the control region of the chosen subframes at nominal transmit power.

In an alternative embodiment, a second access node is provided. The second access node includes a processor configured such that the second access node provides a special subframe configuration to a first access node via at least one of X2 signaling, S1 signaling, a self organizing network (SON) manager, and a system information block, wherein the first access node transmits a control channel to at least one UE during at least one of the special subframes of the second access node.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for operating an access node in a wireless communications network, the method comprising:
   performing, by an access node, at least one of blanking and transmitting at lower than nominal transmit power on at least a portion of a control channel comprising a control region;
   applying, by the access node, the at least one of blanking and transmitting at lower than nominal transmit power only on the control region of chosen subframes of a first component carrier of a plurality of component carriers of the access node; and
   when the at least one of blanking and transmitting at lower than nominal transmit power is applied to the control region of chosen subframes of the first component carrier, transmitting, by the access node, the control region on a second component carrier of the plurality of component carriers,
   wherein the access node is configured to receive a subframe configuration for the chosen subframes from another access node.

2. The method of claim 1, wherein, on the chosen subframes of the access node, the other access node is configured to schedule at least one user equipment (UE).

3. The method of claim 1, further comprising:
transmitting, by the access node, system information on subframes other than the chosen subframes.

4. The method of claim 1, wherein the chosen subframes are one of:
in a fixed pattern within a certain time duration; and
dynamically changing on the subframe level.

5. The method of claim 1, wherein the access node is the access node for a closed subscriber group (CSG) cell.

6. The method of claim 5, further comprising transmitting, by the access node, scheduling assignments to at least one UE on an extended PDCCH (E-PDCCH).

7. The method of claim 5, further comprising transmitting, by the access node, cross carrier scheduling assignments to at least one UE using the control channel on component carriers whose control channel is not blanked.

8. An access node, comprising:
a processor configured such that the access node performs at least one of blanking and transmitting at lower than nominal transmit power on at least a portion of a control channel comprising a control region, and applies at least one of blanking and transmitting at lower than nominal transmit power only on the control region of chosen subframes of a first component carrier of a plurality of component carriers of the access node, and when the at least one of blanking and transmitting at lower than nominal transmit power is applied to the control region of chosen subframes of the first component carrier, transmitting the control region on a second component carrier of the plurality of component carriers,
wherein the access node is configured to receive a subframe configuration for the chosen subframes from another access node.

9. The access node of claim 8, wherein, on the chosen subframes of the access node, the other access node is configured to schedule at least one user equipment (UE).

10. The access node of claim 8, wherein the chosen subframes of the access node are not used to transmit system information by the access node.

11. The access node of claim 8, wherein the chosen subframes are one of:
in a fixed pattern within a certain time duration; and
dynamically changing on the subframe level.

12. The access node of claim 8, wherein the access node is the access node for a closed subscriber group (CSG) cell.

13. The access node of claim 12, wherein the access node transmits scheduling assignments to at least one UE on an extended PDCCH (E-PDCCH).

14. The access node of claim 12, wherein the access node transmits cross carrier scheduling assignments to at least one UE using the control channel on component carriers whose control channel is not blanked.

* * * * *